(12) United States Patent
Hofmann et al.

(10) Patent No.: US 12,404,400 B2
(45) Date of Patent: *Sep. 2, 2025

(54) BLENDS OF COPOLYESTERS HAVING RECYCLED CONTENT AND HIGH HEAT RESISTANCE

(71) Applicant: Eastman Chemical Company, Kingsport, TN (US)

(72) Inventors: Katherine Augusta Hofmann, Kingsport, TN (US); John Thomas Hofmann, Kingsport, TN (US); Douglas Weldon Carico, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 817 days.

This patent is subject to a terminal disclaimer.

(21) Appl. No.: 17/594,915

(22) PCT Filed: May 6, 2020

(86) PCT No.: PCT/US2020/031590
§ 371 (c)(1),
(2) Date: Nov. 3, 2021

(87) PCT Pub. No.: WO2020/231689
PCT Pub. Date: Nov. 19, 2020

(65) Prior Publication Data
US 2022/0186021 A1  Jun. 16, 2022

Related U.S. Application Data

(60) Provisional application No. 62/846,076, filed on May 10, 2019.

(51) Int. Cl.
*C08L 67/02* (2006.01)

(52) U.S. Cl.
CPC ............ *C08L 67/02* (2013.01); *C08L 2207/20* (2013.01)

(58) Field of Classification Search
CPC .................................. C08L 67/02; C08L 55/02
See application file for complete search history.

(56) References Cited

U.S. PATENT DOCUMENTS

| | | |
|---|---|---|
| 3,448,173 A | 6/1969 | Ryan et al. |
| 3,655,825 A | 4/1972 | Souder et al. |
| 3,853,968 A | 12/1974 | Bortnick et al. |
| 3,907,754 A | 9/1975 | Tershansy et al. |
| 3,962,189 A | 6/1976 | Russin et al. |
| 4,010,145 A | 3/1977 | Russin et al. |
| 4,356,299 A | 10/1982 | Cholod et al. |
| 4,446,585 A | 5/1984 | Harding et al. |
| 5,017,680 A | 5/1991 | Sublett |
| 5,391,582 A † | 2/1995 | Muschiatti |
| 5,534,594 A | 7/1996 | Troy et al. |
| 5,668,243 A | 9/1997 | Yau et al. |
| 5,681,918 A | 10/1997 | Adams et al. |
| 6,331,580 B1 | 12/2001 | Molnar |
| 8,604,139 B2 | 12/2013 | Pecorini et al. |
| 2006/0004114 A1* | 1/2006 | Kern ........................ C08J 5/18 524/425 |
| 2009/0181202 A1* | 7/2009 | Pecorini .................... C08J 5/00 528/308 |
| 2012/0157636 A1† | 6/2012 | Neill |
| 2013/0029068 A1* | 1/2013 | Treece ................. C08G 63/199 528/308.1 |
| 2022/0186021 A1* | 6/2022 | Hofmann ............. C08G 63/199 |

FOREIGN PATENT DOCUMENTS

| | | |
|---|---|---|
| WO | WO 2010/110876 A1 | 9/2010 |
| WO | 2018/035337 A1 † | 2/2018 |
| WO | 2018/035341 A1 † | 2/2018 |

OTHER PUBLICATIONS

ASTMD256; "Standard Test Methods for Determining the Izod Pendulum Impact Resistance of Plastics"; Published Nov. 2018.
ASTMD638; "Standard Test Method for Tensile Properties of Plastics"; Published Mar. 2015.
ASTMD648; "Standard Test Method for Deflection Temperature of Plastics Under Flexural Load in the Edgewise Position"; Published Apr. 2018.
ASTMD790; "Standard Test Method for Flexural Properties of Unreinforced and Reinforced Plastics and Electrical Insulating Materials"; Published Jul. 2017.
ASTMD792; "Standard Test Methods for Density and Specific Gravity (Relative Density) of Plastics by Displacement"; Published Jul. 2020.
ASTMD1003; Standard Test Method for Haze and Luminous Transmittance of Transparent Plastics; Published Jun. 2021.
ASTMD3418; "Standard Test Method for Transition Temperatures and Enthalpies of Fusion and Crystallization of Polymers by Differential Scanning Calorimetry"; Published Sep. 2021.

(Continued)

*Primary Examiner* — Mark S Kaucher

(74) *Attorney, Agent, or Firm* — Robert C. Morriss

(57) ABSTRACT

Described are polymer compositions that include a blend of recycled poly(ethylene terephthalate) (rPET) and a copolyester based on monomers that include on terephthalic acid (TPA), ethylene glycol (EG) and 2,2,4,4-tetramethyl-1,3-cyclobutanediol (TMCD), wherein the blend has improved engineering properties compared to the rPET material.

11 Claims, No Drawings

(56) References Cited

OTHER PUBLICATIONS

ASTMD4603; "Standard Test Method for Determining Inherent Viscosity of Poly(Ethylene Terephthalate) (PET) by Glass Capillary Viscometer" Published Jun. 2018.
ASTMD4812; "Standard Test Method for Unnotched Cantilever Beam Impact Resistance of Plastics"; Published Oct. 2019.
ASTMD6290; "Standard Test Method for Color Determination of Plastic Pellets"; Published Jun. 2019.
ASTME308; "Standard Practice for Computing the Colors of Objects by using the CIE System"; Published Sep. 2018.
Notification of Transmittal of The International Search Report and the Written Opinion of the International Searching Authority, or the Declaration with a mailing date of Sep. 10, 2020 for International Application No. PCT/US2020/031590.
Third-Party Submission under 37 CFR 1.290 has been filed on Sep. 12, 2022.

\* cited by examiner
† cited by third party

BLENDS OF COPOLYESTERS HAVING RECYCLED CONTENT AND HIGH HEAT RESISTANCE

CROSS-REFERENCE TO RELATED APPLICATION(S)

This application is a national stage filing under 35 USC § 371 of International Application Number PCT/US2020/031590, filed on, May 6, 2020 which claims the benefit of the filing date to U.S. Provisional Application No. 62/846,076, filed on May 10, 2019, the entire disclosures of which are incorporated by reference herein.

FIELD OF THE INVENTION

This invention generally pertains to polymer compositions having recycle content and high heat resistance. More specifically, the invention pertains to polyester compositions having recycled poly(ethylene terephthalate) (rPET) content and high heat resistance, compared to the neat rPET material.

BACKGROUND OF THE INVENTION

Poly(ethylene terephthalate) (PET) is one of the most ubiquitous plastics in the world and is widely used for fibers for clothing and containers for liquids and foods. A significant amount of PET is recycled, e.g., from PET bottle and container waste streams, and rPET represents one of the cleanest recycle streams of any plastic. However, rPET has limited uses due to its relatively low $T_g$ (~80° C.) and relatively low inherent melting temperature ($T_m$) (approximately 250° C.).

It would be beneficial to have polymeric materials containing rPET that also have improved engineering properties such as high heat resistance.

SUMMARY OF THE INVENTION

It is believed that polymer compositions according to the invention comprising a blend of rPET and a polyester component based on terephthalic acid (TPA), ethylene glycol (EG) and 2,2,4,4-tetramethyl-1,3-cyclobutanediol (TMCD), can provide a polymer composition having improved engineering properties, e.g., higher heat resistance, compared to rPET alone. It is also believed that blends can be provided that have rPET content and excellent engineering properties, such as high clarity, high heat resistance, high stiffness and good durability.

In one aspect, the invention is directed to polymer compositions comprising a blend of rPET and a copolyester, wherein:

the copolyester comprises: (a) diacid residues comprising from about 90 to 100 mole percent of TPA residues; and (b) diol residues comprising at least 58 mole percent of EG residues and up to 42 mole percent TMCD residues, wherein the copolyester comprises a total of 100 mole percent diacid residues and a total of 100 mole percent diol residues.

In embodiments of the invention, the copolyester comprises diol residues comprising from 5 to 42 mole percent TMCD residues and 58 to 95 mole percent EG residues. In one embodiment, the copolyester comprises diol residues comprising 5 to 40 mole percent TMCD residues and 60 to 95 mole percent EG residues. In one embodiment, the copolyester comprises diol residues comprising 20 to 37 mole percent TMCD residues and 63 to 80 mole percent EG residues.

In embodiments of the invention, the copolyester comprises diol residues comprising from 10 to 27 mole percent TMCD residues and 73 to 90 mole percent EG residues. In other embodiments, the copolyester comprises diol residues comprising from 30 to 42 mole percent TMCD residues and 58 to 70 mole percent EG residues.

In embodiments, the blend comprises 5 to 95 wt % of the copolyester and 5 to 95 wt % of rPET. In embodiments, the copolyester and rPET are provided in amounts that are miscible and result in a clear polymer blend.

In embodiments, the blend comprises 50 to 95 wt % of the copolyester and 5 to 50 wt % of rPET, or 50 to 90 wt % copolyester and 10 to 50 wt % rPET, or 60 to 90 wt % copolyester and 10 to 40 wt % rPET.

In embodiments, the blend comprises diol residues comprising from about 5 to about 30, or 10 to 20, 12 to 18 net mole percent of TMCD residues, wherein the blend comprises a total of 100 mole percent diacid residues and a total of 100 mole percent diol residues.

In one embodiment, 100 mole percent of the diacid residues for the copolyester consists of TPA and optionally IPA residues.

In one embodiment, the polymer composition comprises less than 2 wt % of any additional additives.

In one embodiment, the blend has a $T_g$ of at least 85° C., an inherent viscosity (IV) of at least 0.50 dL/g and a $T_m$ of at least 255° C. In embodiments, the blend has an inherent viscosity (IV) of at least 0.70 dL/g, or at least 0.75 dL/g, or at least 0.80 dL/g.

In one aspect, an extruded polymer blend is provided, which comprises the polymer compositions discussed above.

In another aspect, the invention is directed to an article comprising the polymer compositions discussed above. In one embodiment, the article is an injection molded article or a blow molded article. In one embodiment, the article is a bottle or food container.

In one aspect, the invention is directed to a method for forming an article, comprising shaping, extruding, blow molding, or injection molding the polymer compositions discussed above.

In one aspect, the invention is directed to a film comprising the polymer compositions discussed above.

In yet another aspect, a method of making a polymer composition is provided. The method comprises blending rPET and a copolyester (as described herein); forming a melt processable polymer composition from the blend; melt extruding the melt processable polymer composition to form a thermoplastic article.

In one aspect, the present invention provides a melt processable polymer composition where the amount of net TMCD mole % is adjusted by blending copolymer with rPET. The resulting blended composition will have improved engineering properties compared to rPET or PET. The blend composition according to the invention is believed to be superior to PET in temperature resistance, dimensional stability, and durability.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

The present invention relates to the discovery that polyester compositions having recycle PET (rPET) content and improved processing and/or physical properties can be produced from a polyester blend, including rPET and at least one copolyester having a $T_g$ of 85° C. or higher.

Unless specified otherwise, diacid monomer mole percent and diol mole % with respect to an individual polyester component (contained in a blend) are based on a total of 100 mole % diacid residues and 100 mole % diol residues for a total of 200 mole % of all monomer residues for the individual polyester component.

The term "net mole percent" for a monomer residue in a polyester blend means the total mole % of that monomer for the diacid or diol residues, respectively, contained in the total blend. For example, the net mole percent of a diol monomer residue with respect to a polyester blend means the total amount of that diol monomer (in mole percent) for all diol residues (of all individual polymer components) contained in the blend. Thus, if polyester A contains 30 mole % TMCD residues and 70 mole % EG residues, based on 100 mole % diol residues for polyester A; polyester B contains 100 mole TMCD residues, based on 100 mole % diol residues for polyester B; and the blend contains 75 wt % polyester A and 25 wt % polyester B; then the blend has a net mole % of TMCD residues of about 20%, based on the total diol residues for the blend.

The term "melt formed polyester blend" means a melted (e.g., extruded) polymer made from two or more mechanically or physically mixed (e.g. blended) polyester polymers. For example, the two or more polyester polymers can be blended before being fed to an extruder or the two or more polyester polymers can be fed separately to the extruder and blended in the extruder. In the case of different solid polymer pellets, in one embodiment the pellets can be blended to provide a blend of different solid pellets. The pellets can be separately dried and then blended, mixed together and then dried, or mixed and dried simultaneously, prior to being fed to an extruder.

In one aspect, the invention is directed to polymer compositions comprising a blend of rPET and at least one copolyester, wherein:

the copolyester comprises: (a) diacid residues comprising from about 90 to 100 mole percent of TPA residues and from 0 to about 10 mole percent IPA residues; and (b) diol residues comprising at least 58 mole percent of EG residues and up to 42 mole percent of TMCD residues, wherein the copolyester comprises a total of 100 mole percent diacid residues and a total of 100 mole percent diol residues;

wherein the blend comprises 5 to 95 wt % of the copolyester and 5 to 95 wt % of rPET.

In embodiments, the copolyester and rPET are provided in amounts that are miscible and result in a visually clear polymer blend. In embodiments, the polymer composition comprises a blend of at least one copolyester and rPET and has a single Tg, as determined by DSC melt curves at a heating rate of 20° C./min (as discussed herein).

In embodiments of the invention, the blend comprises diol residues comprising from about 5 to about 30, or 10 to 20, 12 to 18 net mole percent of TMCD residues, wherein the blend comprises a total of 100 mole percent diacid residues and a total of 100 mole percent diol residues.

In embodiments of the invention, the polymer composition comprises a blend of polyesters as discussed herein in amounts sufficient to provide a polymer blend comprising residues of:

a diacid content containing about 90 to 100 net mole % TPA and 0 to about 10 net mole % IPA; and a diol content containing about 5 to about 30 net mole % TMCD and about 70 to about 95 net mole % EG, with the final polymer blend containing substantially equal molar proportions of acid equivalents (100 mole %) and diol equivalents (100 mole %) for a total of 200 mole % for all reactants.

In embodiments of the invention, the copolyester comprises diol residues comprising from 5 to 42 mole percent TMCD residues and 38 to 95 mole percent EG residues. In one embodiment, the copolyester comprises diol residues comprising 5 to 40 mole percent TMCD residues and 60 to 95 mole percent EG residues.

In embodiments, the copolyester comprises diol residues comprising 20 to 37 mole percent TMCD residues and 63 to 80 mole percent EG residues. In one embodiment, the copolyester comprises diol residues comprising 22 to 35 mole percent TMCD residues and 65 to 78 mole percent EG residues.

In one embodiment, a polymer composition according to the invention is provided comprising a blend of rPET and at least one copolyester, wherein:

the copolyester comprises: (a) diacid residues comprising from about 95 to 100 mole percent of TPA residues and from 0 to about 5 mole percent IPA residues; and (b) diol residues comprising 73 to 90 mole percent EG residues and 10 to 27 mole percent TMCD residues, wherein the copolyester comprises a total of 100 mole percent diacid residues and a total of 100 mole percent diol residues; and wherein the blend comprises diol residues comprising from about 5 to about 30 net mole percent of TMCD residues, wherein the blend comprises a total of 100 mole percent diacid residues and a total of 100 mole percent diol residues.

In embodiments, the copolyester comprises: a) a dicarboxylic acid component comprising: (i) 90 to 100 mole % terephthalic acid residues; and (ii) about 0 to about 10 mole % of aromatic and/or aliphatic dicarboxylic acid residues having up to 20 carbon atoms; and (b) a glycol component comprising: (i) about 10 to about 27 mole % 2,2,4,4-tetramethyl-1,3-cyclobutanediol (TMCD) residues; and (ii) about 90 to about 73 mole % ethylene glycol residues; and wherein the total mole % of the dicarboxylic acid component is 100 mole %, and wherein the total mole % of the glycol component is 100 mole %; and wherein the inherent viscosity (IV) of the polyester is from 0.50 to 0.8 dL/g as determined in 60/40 (wt/wt) phenol/tetrachloroethane at a concentration of 0.25 g/50 ml at 25° C.; and wherein the L* color values for the polyester is 90 or greater, as determined by the L*a*b* color system measured following ASTM D 6290-98 and ASTM E308-99, performed on polymer granules ground to pass a 1 mm sieve. In embodiments, the L* color values for the polyester is greater than 90, as determined by the L*a*b* color system measured following ASTM D 6290-98 and ASTM E308-99, performed on polymer granules ground to pass a 1 mm sieve.

In certain embodiments, the glycol component of the copolyester comprises: (i) about 15 to about 25 mole % 2,2,4,4-tetramethyl-1,3-cyclobutanediol (TMCD) residues; and (ii) about 85 to about 75 mole % ethylene glycol residues; or (i) about 20 to about 25 mole % 2,2,4,4-tetramethyl-1,3-cyclobutanediol (TMCD) residues; and (ii)

about 80 to about 75 mole % ethylene glycol residues; or (i) about 21 to about 24 mole % 2,2,4,4-tetramethyl-1,3-cyclobutanediol (TMCD) residues; and (ii) about 86 to about 79 mole % ethylene glycol residues.

In one aspect, the invention relates to a polyester composition comprising a blend of rPET and at least one copolyester which copolyester comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 10 to about 27 mole % 2,2,4,4-tetramethyl-1,3-cyclobutanediol residues; and
    (ii) about 73 to about 90 mole % ethylene glycol residues, and
    (iii) less than about 5 mole %, or less than 2 mole %, of any other modifying glycols;
  wherein the total mole % of the dicarboxylic acid component is 100 mole %, and wherein the total mole % of the glycol component is 100 mole %; and
  wherein the inherent viscosity of the copolyester is from 0.50 to 0.8 dL/g as determined in 60/40 (wt/wt) phenol/tetrachloroethane at a concentration of 0.25 g/50 ml at 25° C.

In embodiments, the copolyester has at least one of the following properties chosen from: a $T_g$ of from about 90 to about 108° C. as measured by a TA 2100 Thermal Analyst Instrument at a scan rate of 20° C./min, a flexural modulus at 23° C. of greater than about 2000 MPa (290,000 psi) as defined by ASTM D790, and a notched Izod impact strength greater than about 25 J/m (0.47 ft-lb/in) according to ASTM D256 with a 10-mil notch using a ⅛-inch thick bar at 23° C. In one embodiment, the L* color values for the copolyester is 90 or greater, or greater than 90, as determined by the L*a*b* color system measured following ASTM D 6290-98 and ASTM E308-99, performed on polymer granules ground to pass a 1 mm sieve.

In one embodiment, the copolyester further comprises: (II) a catalyst/stabilizer component comprising: (i) titanium atoms in the range of 10-50 ppm based on polymer weight, (ii) optionally, manganese atoms in the range of 10-100 ppm based on polymer weight, and (iii) phosphorus atoms in the range of 10-200 ppm based on polymer weight. In one embodiment, the 2,2,4,4-tetramethyl-1,3-cyclobutanediol residues is a mixture comprising more than 50 mole % of cis-2,2,4,4-tetramethyl-1,3-cyclobutanediol residues and less than 50 mole % of trans-2,2,4,4-tetramethyl-1,3-cyclobutanediol residues.

In embodiments, copolyesters useful in the invention may be amorphous or semicrystalline. In one embodiment, copolyesters useful in the invention can have a relatively low crystallinity. In embodiments, the copolyesters useful in the invention can thus have a substantially amorphous morphology, meaning that the polyesters comprise substantially unordered regions of polymer.

In embodiments, the glycol component for the copolyesters useful in the invention can include but are not limited to at least one of the following combinations of ranges: about 10 to about 30 mole % 2,2,4,4-tetramethyl-1,3-cyclobutanediol and about 90 to about 70 mole % ethylene glycol; about 10 to about 27 mole % 2,2,4,4-tetramethyl-1,3-cyclobutanediol and about 90 to about 73 mole % ethylene glycol; about 15 to about 26 mole % 2,2,4,4-tetramethyl-1,3-cyclobutanediol and about 85 to about 74 mole % ethylene glycol; about 18 to about 26 mole % 2,2,4,4-tetramethyl-1,3-cyclobutanediol and about 82 to about 77 mole % ethylene glycol; about 20 to about 25 mole % 2,2,4,4-tetramethyl-1,3-cyclobutanediol and about 80 to about 75 mole % ethylene glycol; about 21 to about 24 mole % 2,2,4,4-tetramethyl-1,3-cyclobutanediol and about 79 to about 76 mole % ethylene glycol; or about 22 to about 24 mole % 2,2,4,4-tetramethyl-1,3-cyclobutanediol and about 78 to about 76 mole % ethylene glycol.

For embodiments of the invention, the copolyesters useful in the invention may exhibit at least one of the following inherent viscosities as determined in 60/40 (wt/wt) phenol/tetrachloroethane at a concentration of 0.25 g/50 ml at 25° C. from 0.50 to 0.8 dL/g; 0.55 to 0.75 dL/g; 0.57 to 0.73 dL/g; 0.58 to 0.72 dL/g; 0.59 to 0.71 dL/g; 0.60 to 0.70 dL/g; 0.61 to 0.69 dL/g; 0.62 to 0.68 dL/g; 0.63 to 0.67 dL/g; 0.64 to 0.66 dL/g; or about 0.65 dL/g.

In embodiments of the invention, the Tg of the copolyester can be chosen from one of the following ranges: 85 to 100° C.; 86 to 99° C.; 87 to 98° C.; 88 to 97° C.; 89 to 96° C.; 90 to 95° C.; 91 to 95° C.; 92 to 94° C.

In another aspect, the copolyester comprises diol residues comprising 30 to 42 mole percent TMCD residues and 58 to 70 mole percent EG residues. In one embodiment, the copolyester comprises diol residues comprising 33 to 38 mole percent TMCD residues and 62 to 67 mole percent EG residues.

In one embodiment, a polymer composition according to the invention is provided comprising a blend of rPET and at least one copolyester, wherein:
  the copolyester comprises: (a) diacid residues comprising from about 95 to 100 mole percent of TPA residues and from 0 to about 5 mole percent IPA residues; and (b) diol residues comprising 58 to 70 mole percent EG residues and 30 to 42 mole percent TMCD residues, wherein the copolyester comprises a total of 100 mole percent diacid residues and a total of 100 mole percent diol residues; and
  wherein the blend comprises diol residues comprising from about 5 to about 30 net mole percent of TMCD residues, wherein the blend comprises a total of 100 mole percent diacid residues and a total of 100 mole percent diol residues.

In embodiments, the copolyester comprises: a) a dicarboxylic acid component comprising: (i) 90 to 100 mole % terephthalic acid residues; and (ii) about 0 to about 10 mole % of aromatic and/or aliphatic dicarboxylic acid residues having up to 20 carbon atoms; and (b) a glycol component comprising: (i) about 30 to about 42 mole % 2,2,4,4-tetramethyl-1,3-cyclobutanediol (TMCD) residues; and (ii) about 70 to about 58 mole % ethylene glycol residues; and wherein the total mole % of the dicarboxylic acid component is 100 mole %, and wherein the total mole % of the glycol component is 100 mole %; and wherein the inherent viscosity (IV) of the polyester is from 0.50 to 0.70 dL/g as determined in 60/40 (wt/wt) phenol/tetrachloroethane at a concentration of 0.25 g/50 ml at 25° C.; and wherein the L* color values for the polyester is 90 or greater, as determined by the L*a*b* color system measured following ASTM D 6290-98 and ASTM E308-99, performed on polymer granules ground to pass a 1 mm sieve. In embodiments, the L* color values for the polyester is greater than 90, as determined by the L*a*b* color system measured following ASTM D 6290-98 and ASTM E308-99, performed on polymer granules ground to pass a 1 mm sieve.

In certain embodiments, the glycol component comprises: (i) about 32 to about 42 mole % 2,2,4,4-tetramethyl-1,3-cyclobutanediol (TMCD) residues, and (ii) about 68 to about 58 mole % ethylene glycol residues; or (i) about 34 to about 40 mole % 2,2,4,4-tetramethyl-1,3-cyclobutanediol (TMCD) residues, and (ii) about 66 to about 60 mole % ethylene glycol residues; or (i) greater than 34 to about 40 mole % 2,2,4,4-tetramethyl-1,3-cyclobutanediol (TMCD) residues, and (ii) less than 66 to about 60 mole % ethylene glycol residues; or (i) 34.2 to about 40 mole % 2,2,4,4-tetramethyl-1,3-cyclobutanediol (TMCD) residues, and (ii) 65.8 to about 60 mole % ethylene glycol residues; or (i) about 35 to about 39 mole % 2,2,4,4-tetramethyl-1,3-cyclobutanediol (TMCD) residues, and (ii) about 65 to about 61 mole % ethylene glycol residues; or (i) about 36 to about 37 mole % 2,2,4,4-tetramethyl-1,3-cyclobutanediol (TMCD) residues; and (ii) about 64 to about 63 mole % ethylene glycol residues.

In one aspect, the invention relates to a polyester composition comprising a blend or rPET and at least one copolyester which comprises:
  a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 30 to about 42 mole % 2,2,4,4-tetramethyl-1,3-cyclobutanediol residues; and
    (ii) about 70 to about 58 mole % ethylene glycol residues, and
    (iv) less than about 5 mole %, or less than 2 mole %, of any other modifying glycols;
wherein the total mole % of the dicarboxylic acid component is 100 mole %, and wherein the total mole % of the glycol component is 100 mole %; and
wherein the inherent viscosity of the polyester is from 0.50 to 0.70 dL/g as determined in 60/40 (wt/wt) phenol/tetrachloroethane at a concentration of 0.25 g/50 ml at 25° C.

In embodiments, the copolyester has at least one of the following properties chosen from: a $T_g$ of from about 100 to about 110° C. as measured by a TA 2100 Thermal Analyst Instrument at a scan rate of 20° C./min, a flexural modulus at 23° C. of equal to or greater than 2000 MPa (about 290,000 psi), or greater than 2200 MPa (319,000 psi) as defined by ASTM D790, a notched Izod impact strength of about 30 J/m (0.56 ft-lb/in) to about 80 J/m (1.50 ft-lb/in) according to ASTM D256 with a 10-mil notch using a ⅛-inch thick bar at 23° C., and less than 5% loss in inherent viscosity after being held at a temperature of 293° C. (560° F.) for 2 minutes. In one embodiment, the L* color values for the polyester composition is 90 or greater, or greater than 90, as determined by the L*a*b* color system measured following ASTM D 6290-98 and ASTM E308-99, performed on polymer granules ground to pass a 1 mm sieve.

In one embodiment, the copolyester comprises a diol component having at least 30 mole percent TMCD residues (based on the diols) and a catalyst/stabilizer component comprising: (i) titanium atoms in the range of 10-60 ppm based on polymer weight, (ii) manganese atoms in the range of 10-100 ppm based on polymer weight, and (iii) phosphorus atoms in the range of 10-200 ppm based on polymer weight. In one embodiment, the 2,2,4,4-tetramethyl-1,3-cyclobutanediol residues is a mixture comprising more than 50 mole % of cis-2,2,4,4-tetramethyl-1,3-cyclobutanediol residues and less than 50 mole % of trans-2,2,4,4-tetramethyl-1,3-cyclobutanediol residues.

In embodiments, the glycol component for the copolyesters useful in the invention includes but are not limited to at least one of the following combinations of ranges: about 30 to about 42 mole % 2,2,4,4-tetramethyl-1,3-cyclobutanediol and about 58 to 70 mole % ethylene glycol; about 32 to about 42 mole % 2,2,4,4-tetramethyl-1,3-cyclobutanediol and about 58 to 68 mole % ethylene glycol; about 32 to about 38 mole % 2,2,4,4-tetramethyl-1,3-cyclobutanediol and about 64 to 68 mole % ethylene glycol; about 33 to about 41 mole % 2,2,4,4-tetramethyl-1,3-cyclobutanediol and about 59 to 67 mole % ethylene glycol; about 34 to about 40 mole % 2,2,4,4-tetramethyl-1,3-cyclobutanediol and about 60 to 66 mole % ethylene glycol; greater than 34 to about 40 mole % 2,2,4,4-tetramethyl-1,3-cyclobutanediol and 60 to less than 66 mole % ethylene glycol; 34.2 to 40 mole % 2,2,4,4-tetramethyl-1,3-cyclobutanediol and about 60 to 65.8 mole % ethylene glycol; about 35 to about 39 mole % 2,2,4,4-tetramethyl-1,3-cyclobutanediol and about 61 to 65 mole % ethylene glycol; about 35 to about 38 mole % 2,2,4,4-tetramethyl-1,3-cyclobutanediol and about 62 to 65 mole % ethylene glycol; or about 36 to about 37 mole % 2,2,4,4-tetramethyl-1,3-cyclobutanediol and about 63 to 64 mole % ethylene glycol.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C. from 0.50 to 0.70 dL/g; 0.55 to 0.65 dL/g; 0.56 to 0.64 dL/g; 0.56 to 0.63 dL/g; 0.56 to 0.62 dL/g; 0.56 to 0.61 dL/g; 0.57 to 0.64 dL/g; 0.58 to 0.64 dL/g; 0.57 to 0.63 dL/g; 0.57 to 0.62 dL/g; 0.57 to 0.61 dL/g; 0.58 to 0.60 dL/g or about 0.59 dL/g.

In embodiments, the rPET comprises, or is essentially, recycled polymer from returned PET bottles. In embodiments, the rPET comprises, or is essentially, ground flake recycled polymer from returned bottles. In embodiments, the rPET comprises, or is essentially, pellets made from recycled polymer from returned bottles. It should be understood that recycled polymer from returned bottles, while being primarily PET, may include impurities introduced into the bottle recycle stream, such as, for example, other polymers (besides PET), metal (e.g., from aluminum beverage cans), pigments and colorants (e.g., from plastic waste items), non-plastic materials (such as paper, glass and silicone), fines, dirt, and rubber materials. In embodiments, the rPET can comprise recycled polymer from one or more of the following product category sources: textiles, carpeting, auto interiors, and packaging products. Again, it should be understood that each recycle stream can include impurities common for a given product stream.

In one embodiment, the rPET comprises, or is essentially, pellets of PET polymer from returned bottles, where the polymer is screened in the pellet making process to reduce impurities. In embodiments, the rPET can further comprise additives such as, for example, one or more of the additives in accordance with embodiments of the invention (discussed herein), that may be residual from the plastic recycle stream or added by the recycle processor (e.g., rPET pellet producer).

In embodiments, the rPET can comprise PET polymer made from monomers that comprise at least in part one or more chemically recycled monomers. In embodiments, the chemically recycled monomers are produced from a methanolysis process of waste polymer(s). In embodiments, the waste polymer is waste PET, e.g., post-consumer or industrial waste PET.

In embodiments, the rPET has a Tg in the range of from about 82 to 86° C., or 83 to 85° C. In embodiments, the rPET can have a degree of crystallinity in the range of from about 30 to 40%, or 32 to 38%, or 32 to 36%, measured by DSC heating at 10° C./min from 20 to 280° C., thermal hold at 280° C. for 3 min., and cooling back to 20° C. at 10° C./min. In embodiments, the rPET can have an inherent viscosity (IV) in the range from 0.65 to 0.84.

In embodiments, the polyester compositions useful in this invention can be visually clear. The term "visually clear" is defined herein as an appreciable absence of cloudiness, haziness, and/or muddiness, when inspected visually.

In one embodiment, the polyester compositions can have color values L*, a* and b* which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate. In various embodiments, the color values can be determined for polymers having the presence of and/or in the absence of toner(s).

The polyesters used to prepare the blends according to the present invention can be readily prepared by conventional methods well known in the art. For example, melt-phase or a combination of melt-phase and solid-phase polycondensation techniques may be used depending on desired characteristics.

The TMCD residues in the polyester compositions may have any combination of cis and trans isomer ratios. In embodiments, the TMCD residues have a cis/trans isomer ratio in the range of about 50 to about 80%, or greater than 50 to 80%, or greater than 50 to 70%, or 52 to 68%.

Examples of catalyst materials that may be used in the synthesis of the copolyesters utilized in the present invention include titanium, manganese, tin, zinc, cobalt, antimony, gallium, lithium, calcium, silicon, and germanium. Such catalyst systems are described in U.S. Pat. Nos. 3,907,754, 3,962,189, 4,010,145, 4,356,299, 5,017,680, 5,668,243 and 5,681,918, herein incorporated by reference in their entirety. Preferred catalyst metals include titanium and manganese, and most preferred is titanium. The amount of catalytic metal used may range from about 5 to 100 ppm, but the use of catalyst concentrations of about 5 to about 35 ppm titanium is preferred in order to provide polyesters having good color and thermal stability.

Phosphorus compounds can be used in combination with the catalyst metals, and any of the phosphorus compounds normally used in making polyesters may be used. Typically, up to about 100 ppm phosphorus may be used. In embodiments, the phosphorous compounds can be chosen from phosphate esters useful in the invention as thermal stabilizers and/or color stabilizers and can include but are not limited to, at least one of the following: triaryl phosphates, alkyl diaryl phosphates, and mixed alkyl aryl phosphates.

In one embodiment, the phosphate esters useful as thermal stabilizers and/or color stabilizers in the invention can include but are not limited to, at least one of the following: triaryl phosphates and mixed alkyl aryl phosphates.

In one embodiment, at least one phosphorus compound useful in the invention can comprise, but is not limited to, triaryl phosphates, such as, for example, triphenyl phosphate. In one embodiment, at least one thermal stabilizer comprises, but is not limited to Merpol A. In one embodiment, at least one thermal stabilizer useful in the invention comprises, but is not limited to, at least one of triphenyl phosphate and Merpol A. Merpol A is a phosphate ester commercially available from Stepan Chemical Co and/or E.I. DuPont de Nemours & Co. The CAS Registry number for Merpol A is believed to be CAS Registry #37208-27-8.

In embodiments, equivalent total molar quantities of catalyst and phosphorus, wherein the catalyst is a titanium catalyst, or optionally a combination of manganese and titanium catalyst, can be superior to tin and phosphorus systems with regard to TMCD incorporation, good color, and reactivity to achieve desired inherent viscosity (IV) over a compositional range of TMCD from about 10 to about 27 mole %, or about 15 to about 25 mole %, based on the glycol component.

In certain embodiments, the copolyester can comprise a catalyst/stabilizer component comprising: (i) titanium atoms in the range of 10-50 ppm based on polymer weight, (ii) optionally, manganese atoms in the range of 10-100 ppm based on polymer weight, and (iii) phosphorus atoms in the range of 10-200 ppm based on polymer weight. In certain embodiments, the catalyst/stabilizer component comprises: (i) titanium atoms in the range of 10-50 ppm based on polymer weight, (ii) manganese atoms in the range of 10-100 ppm based on polymer weight, and (iii) phosphorus atoms in the range of 10-200 ppm based on polymer weight. In certain embodiments, the catalyst/stabilizer component comprises no intentionally added tin, where tin may only be present as an impurity. In certain embodiments, the catalyst/stabilizer component comprises no tin, or, if present, less than 5 ppm tin, or less than 2 ppm tin, or less than 1 ppm tin. The catalyst/stabilizer component can result in a good combination of TMCD incorporation, reactivity to achieve a desired target IV, increased brightness and reduced yellowness that cannot be achieved when using significant amounts of tin catalyst.

In certain embodiments, the catalyst used to prepare the copolyester comprises at least one titanium compound, and, optionally, at least one manganese compound. In certain embodiments, the catalyst comprises no tin, or, if present, less than 5 ppm tin, or less than 2 ppm tin, or less than 1 ppm tin based on the total weight of the resulting polymer. In one embodiment, the catalyst comprises no tin.

In another embodiment, approximately equivalent total molar quantities of catalyst and phosphorus, wherein the catalyst is a combination of manganese and titanium catalyst, is superior to tin and phosphorus alone, titanium and phosphorus alone, or a combination of titanium, tin and phosphorus, with regards to TMCD incorporation, good color, and reactivity to achieve desired inherent viscosity (IV) over a compositional range of TMCD from about 30 to about 42 mole %, or about 32 to about 42 mole %, or about 32 to about 38 mole %, or about 34 to about 39 mole %, or greater than 34 to about 39 mole %, or 34.2 to about 39 mole %, or about 35 to about 39 mole %, based on the glycol component. In embodiments, the titanium catalyst can be provided in the form of titanium tetraisopropoxide and the manganese catalyst can be provided in the form of manganese diacetate.

In certain embodiments, the polyester composition further comprises: (c) a catalyst/stabilizer component comprising: (i) titanium atoms in the range of 10-60 ppm based on polymer weight, (ii) manganese atoms in the range of 10-100 ppm based on polymer weight, and (iii) phosphorus atoms in the range of 10-200 ppm based on polymer weight, In certain embodiments, the catalyst/stabilizer can comprise tin atoms in the range of 5 to less than 25 ppm, or 5 to 20 ppm, based on polymer weight. In certain embodiments, the catalyst/stabilizer component comprises no tin, or, if present, less than 5 ppm tin, or less than 2 ppm tin, or less than 1 ppm tin. In certain embodiments, the catalyst/stabilizer does not comprise any intentionally added tin atoms, but may include tin in low levels as an impurity. The catalyst/stabilizer component can result in a good combination of TMCD incorporation, reactivity to achieve a desired target IV, increased brightness, and reduced yellowness, that cannot be achieved by titanium/phosphorus alone, or tin/phosphorus alone.

In certain embodiments, the catalyst comprises at least one catalyst comprising at least one manganese compound and at least one titanium compound. In certain embodiments, the at least one catalyst can further comprise, at least one additional compound selected from tin, gallium, zinc, antimony, cobalt, magnesium, germanium, lithium, aluminum compounds and an aluminum compound with lithium hydroxide or sodium hydroxide. In embodiments, the additional compound(s) are present in minor amounts in weight percent relative to the titanium and manganese compounds. In certain embodiments, the additional compounds are present in an amount to provide less than 20 ppm, or less than 10 ppm, or less than 5 ppm, of the additional selected metal in the final polymer.

Although not required, other additives typically present in copolyesters may be used, if desired, so long as they do not hinder the performance of the copolyesters. Such additives may include, but are not limited to, antioxidants, ultraviolet light and heat stabilizers, metal deactivators, colorants, pigments, fillers (e.g., glass fiber), pinning agents, impact modifiers, nucleating agents, branching agents, flame retardants, mold release agents, surface modifying agents, e.g., COF or friction reducing agents, and the like.

In embodiments, the polyester blend can comprise one or more additives to modify the coefficient of friction (COF). In embodiments, the one or more additives will reduce the COF molded articles produced from the blend. In embodiments, the polyester blend can comprise one or more additives to modify the coefficient of friction (COF) chosen from waxes, siloxanes, silicones, fluorinated polymers, fatty acids, or fatty acid esters. In embodiments, the one or more COF modifying additives are present in a total amount of 0.1 to 12 wt %, 0.1 to 10 wt %, or 0.1 to 8 wt %, or 0.1 to 6 wt %, or 0.1 to 4 wt %, or 0.1 to 2 wt %, or 0.1 to 1.5 wt %, or 0.2 to 12 wt %, 0.2 to 10 wt %, or 0.2 to 8 wt %, or 0.2 to 6 wt %, or 0.2 to 4 wt %, or 0.2 to 2 wt %, or 0.2 to 1.5 wt %, based on the total weight of the blend. In embodiments, the one or more COF modifying additives are chosen from waxes, fatty acids, or fatty acid esters (e.g., ester of montanic acid with multifunctional alcohols, e.g., Licowax E) and are present in a total amount of 0.1 to 2 wt %, 0.1 to 1.5 wt %, or 0.2 to 2 wt %, or 0.2 to 1.5 wt %, based on the total weight of the blend.

Branching agents useful in making the copolyesters formed within the context of the invention can be ones that provide branching in the acid unit portion of the copolyester, or in the glycol unit portion, or it can be a hybrid. Some examples of branching agents are polyfunctional acids, polyfunctional anhydrides, polyfunctional glycols and acid/glycol hybrids. Examples include tri- or tetracarboxylic acids and their corresponding anhydrides, such as trimesic acid, pyromellitic acid, and lower alkyl esters thereof and the like, and tetrols such as pentaerythritol. Also, triols such as trimethylopropane or dihydroxy carboxylic acids and hydroxydicarboxylic acids and derivatives, such as dimethyl hydroxy terephthalate, and the like are useful within the context of this invention. Trimellitic anhydride is a preferred branching agent.

In embodiments, the polymer composition can comprise at least one chain extending agent. Suitable chain extending agents include, but are not limited to, multifunctional (including, but not limited to, bifunctional) isocyanates, multifunctional epoxides, including for example, phenoxy resins. In one embodiment, the chain extending agents have epoxide dependent groups. In one embodiment, the chain extending additive can be one or more styrene-acrylate copolymers with epoxide functionalities. In one embodiment, the chain extending additive can be one or more copolymers of glycidyl methacrylate with styrene.

In certain embodiments, chain extending agents may be added to the rPET, to the copolyester, or to the blend during or after blending. Chain extending agents can be incorporated by compounding or by addition during conversion processes such as injection molding or extrusion. In embodiments, the chain extending agent is present in an amount of from about 0.1 percent by weight to about 10 percent by weight, or from about 0.1 to about 5 percent by weight, based on the total weight of the polymer composition.

Chain extending additives can also be added during melt processing to build molecular weight through 'reactive extrusion' or 'reactive chain coupling' or any other process known in the art.

In embodiments, any of the additives discussed herein, with regard to the copolyester, can be added to the copolyester, to the rPET, or to the blend during or after blending.

In embodiments of the invention, the total amount of additives in the polymer composition, which comprises the polyester blends described herein, is 40 weight percent or less, or 30 weight percent or less, or 20 weight percent of less, based on the total weight of the composition. In embodiments, the total amount of additives in the polymer composition, which comprises the polyester blends described herein, is less than 20, or less than 15, or less than 10, or less than 5, or less than 4, or less than 3, or less than 2, or less than 1 weight percent, based on the total weight of the polymer composition. In embodiments, the polymer composition can include additives in an amount from about 0.1 to about 2, or about 0.1 to about 1 weight percent, based on the total weight of the polymer composition. In embodiments, the polymer composition can include additives in an amount from 0.1 to 40 wt %, or 0.1 to 30 wt %, or 0.1 to 20 wt %, or 0.1 to 10 wt %, or 0.1 to 5 wt %, or 0.5 to 40 wt %, or 0.5 to 30 wt %, or 0.5 to 20 wt %, or 0.5 to 10 wt %, or 0.5 to 5 wt %, or 1 to 40 wt %, or 1 to 30 wt %, or 1 to 20 wt %, or 1 to 10 wt %, or 1 to 5 wt %, or 5 to 40 wt %, or 5 to 30 wt %, or 5 to 20 wt %, or 5 to 10 wt %, based on the total weight of the polymer composition. In one embodiment, the polymer composition includes no additives other than residual catalyst.

In embodiments of the invention, the polyester blend is crystallizable and has a melting point greater than about 225° C., or greater than about 235° C. Melting points were measured herein using differential scanning calorimetry (DSC) in accordance with ASTM D3418-15.

The polyester compositions of the invention may be generated from blends of pellets of two or more copolyester resins as long as the blend composition fits the composition parameters described herein. For example, blends can be made from different copolyesters (in addition to the rPET) containing from 0 to 42 mole % TMCD, or 1 to 40 mole % TMCD monomer residues in various ratios, as long as the final blended composition meets the criteria stated herein. In one embodiment, the blend can be made from two or more different copolyesters provided that the blend comprises diol residues within the ranges discussed herein, e.g., from 5 to 30 net mole % TMCD.

In embodiments, the polyester blend composition has a haze of less than 10%, or less than 8%, or less than 7%, or less than 6%, or less than 5%. In embodiments, the polyester blend composition has a haze of less than 4%, or less than 2%, or less than 1%. In embodiments, the polyester blend composition has a haze of less than 0.9%, or less than 0.8%, or less than 0.7%, or less than 0.6%, or less than 0.5%, or less than 0.4%.

In one embodiment, the polyester blend composition is a melt formed blend that comprises less than 2 wt % of any additional additives.

In one embodiment, the copolyester has an inherent viscosity of about 0.5 to 1.2 dL/g, and the rPET has an inherent viscosity of about 0.5 to 1.0 dL/g. In one embodiment, the copolyester has an inherent viscosity of about 0.5 to about 0.7 dL/g. In one embodiment, the copolyester has an inherent viscosity of about 0.55 to about 0.68 dL/g.

In In another aspect, the invention is directed to polymer compositions comprising a blend of rPET, at least one copolyester, and at least one impact modifier, wherein:

the copolyester comprises: (a) diacid residues comprising from about 90 to 100 mole percent of TPA residues; and (b) diol residues comprising at least 58 mole percent of EG residues and up to 42 mole percent TMCD residues, wherein the copolyester comprises a total of 100 mole percent diacid residues and a total of 100 mole percent diol residues; and wherein the rPET is present in an amount from 5 to 50 wt %, the copolyester is present in an amount from 35 to 90 wt %, and the impact modifier is present in an amount from 0.5 to 15 wt %, all based on the total weight of the polymer composition In embodiments of the invention, the impact modifier can be any material found to increase the impact strength of the polymer compositions. In one embodiment, the impact modifier can be any polymeric material classified as an elastomer with a glass transition temperature (Tg) below room temperature. Tg can be measured for example according to ASTM D3418 using a TA 2100 Thermal Analyst Instrument using a scan rate of 20° C./min. Several classes of impact modifier fit this description.

In one embodiment, the impact modifier can be selected from the class of materials known as modified polyolefins. In this class, the olefin is copolymerized with additional monomers that limit the crystallization of the polymer, increase the amount of the chain with Tg below room temperature, and reduce the modulus below 500 MPa. Examples of modified olefins include EMA (examples include Elvaloy 4051, Lotader 3410 and Lotader 8900), EBA, EVA (examples include Levamelt 500, Levamelt 600, Levamelt 700, Levamelt 800, Elvax 40W, Evatane 28-40, Evatane 40-55, Evatane 18-150, Bynel E418 and Bynel 3101), EEA, EPDM (examples include Royaltuf 498), and EPR.

In one embodiment, the impact modifier is a block copolymer in which at least one segment of the chain has a Tg below room temperature, referred to as the soft segment, and at least one segment of the chain has a Tg or Tm above room temperature, referred to as the hard segment. These block copolymers are also commonly referred to as thermoplastic elastomers (TPEs). Examples of block copolymers of this class include styrenic materials such as SBS, SEBS, and SIS (examples include Kraton G1657MS, Kraton FG1901 G and Kraton FG1924 G); thermoplastic urethanes (TPU) (examples include Elastolan 1170Z, Estane 2355, Estane ALR CL87A and Estane ALR 72A); polyester-ether copolymers (examples include Ecdel 9966 and Hytrel 3078) or polyamide-ether copolymers (examples include Pebax 5533).

In one embodiment, the impact modifier can be selected from the class of emulsion-prepared materials known as core-shell impact modifiers. In one embodiment, the impact modifier is a MBS core-shell impact modifier such as a methacrylate-butadiene-styrene that has a core made out of butadiene-styrene copolymers and shell made out of methyl methacrylate-styrene copolymer. In another embodiment, the impact modifier is an acrylic core-shell impact modifier that has a core made from an acrylic polymer, such as butyl acrylate or styrene butyl acrylate, and shell from made from polymethylmethacrylate or styrene methylmethacryalate copolymer.

In one embodiment of the invention, the core shell impact modifier is an MBS impact modifier that can comprise:
(A) from about 70 to about 85 parts of a core comprising from about 15 to about 35 percent by weight of units derived from at least one vinyl aromatic monomer, and from about 65 to about 85 percent by weight of units derived from at least one diolefin monomer;
(B) from about 8 to about 14 parts of an inner graft stage comprising at least one vinyl aromatic monomer or at least one C1-C4 alkyl methacrylate monomer;
(C) from about 0.1 to about 5 parts of an intermediate sealer stage comprising at least one monomer selected from a C1-C8 alkyl acrylate or a polyunsaturated crosslinker; and
(D) from about 10 to about 16 parts of an outer shell comprising at least one C1-C4 alkyl (meth)acrylate monomers or at least one vinyl aromatic monomer.

In embodiments, the MBS impact modifier can comprise graft polymer compositions comprising 10 to 70 percent by weight of a polymer or a copolymer of butadiene and grafts of firstly methyl(meth)acrylate and cross-linker, and secondly of styrene, and thirdly of methyl(meth)acrylate with an optional cross-linker.

Monomers suitable for polymerization with the conjugated diolefin and preferably with butadiene, can include alkenyl aromatic compounds and preferably vinyl aromatic compounds such as styrene, divinylbenzene, alpha-methyl styrene, vinyl toluene, hydrogenated styrene; lower (CZ-Cu) alkyl acrylates such as ethyl acrylate, n-propylacrylate, n-butyl acrylate, Z-methylbutylacrylate, 3-methylbutyl acrylate, amylacrylate, n-hexylacrylate, Z-ethylhexyl acrylate; lower (C2-C12) alkyl(meth)acrylates; acrylonitriles; olefins; and the like; or a combination of any of the foregoing.

Suitable cross-linking agents include divinylbenzene; di(meth)acrylates; diacrylates such as the diacrylate of mono-, di- or polyethylene glycol; their (meth)acrylates; divinyl sulfide; divinyl ether; vinyl acrylate; vinyl(meth) acrylate; trivinylbenzene; trimethylolpropane; tri(meth) acrylate; triallyl cyanurate and triallyl isocyanurate.

In one embodiment, the MBS core-shell impact modifier can comprise a copolymer of butadiene and styrene and most preferably a terpolymer of butadiene, styrene, and divinylbenzene. Although the relative amounts of the monomers which comprise the copolymeric substrate may vary, the butadiene component will typically comprise from about 30 to 100 parts by weight, the styrene component will comprise from 0 to about 70 parts by weight, and the divinylbenzene component will comprise from 0 to about 5 parts by weight based upon 100 parts by weight of butadiene, styrene, and divinylbenzene combined. In an embodiment, the copolymer substrate can comprise from about 50 to about 90 parts by weight of butadiene, from about 10 to about 50 parts by weight of styrene, and from 0 to about 5 parts by weight of divinylbenzene on the same basis, and most preferably, from about 65 to about 85 parts by weight of butadiene, from about 15 to about 35 parts by weight of styrene, and from about 0.5 to about 2.0 parts by weight of divinylbenzene on the same basis.

Examples of methacrylate-butadiene-styrene core shell polymers are those described in, but not limited to, patents U.S. Pat. Nos. 4,446,585, 5,534,594, and 6,331,580. MBS core-shell impact modifiers can be obtained as Kane Ace B564 from Kaneka, Clearstrength from Arkema, Metablen C and Metablen E from Mitsubishi Chemical, Paraloid from Dow, and Visiomer from Evonik.

In one embodiment of the present invention, the core shell impact modifier is an acrylic impact modifier comprising about 25 to 95 weight percent of a first elastomeric phase polymerized from a monomer system comprising about 75 to 99.8 percent by weight of a (C1 to C6) alkyl acrylate, 0.1 to 5 percent by weight cross-linking monomer, and 0.1 to 5 percent by weight graft linking monomer, and about 75 to 5 weight percent of a final, rigid thermoplastic phase free of epoxy groups polymerized in the presence of said elastomeric phase.

Examples of useful acrylates are methyl acrylate, ethyl acrylate, butyl acrylate, 2-ethylhexyl acrylate and the like. In some embodiments, the acrylates are n-butyl acrylate and ethyl acrylate.

Graft linking monomer is defined as polyethylenically unsaturated monomer which has both a highly reactive double bond and a double bond of lower reactivity such that the highly reactive double bond tends to polymerize during the first stage monomer polymerization leaving a remaining double bond for polymerization during the next stage polymerization and thereby to graft link the first stage with the second stage polymers. In some embodiments, the graft linking monomers are allyl methacrylate, allyl acrylate and diallyl maleate. In an embodiment, 0.05 to 3 percent graft linking monomer is present based on first stage monomer systems. Cross linking monomer is also preferably present, generally in amounts of about 0.05 to 3 percent by weight based on first stage monomer system, and is defined as a polyethylenically unsaturated monomer having at least two double bonds of about equal reactivity so as to cause cross-linking in the first stage polymerization. Examples of typical cross-linking monomers are 1,3-butylene diacrylate, 1,3-butylene dimethacrylate, divinylbenzene and the like.

By "epoxy functionality" is meant the epoxy units which are pendant from the final stage polymer. In some embodiments, epoxy functionality is incorporated into the final stage polymer by use of epoxy containing monomer such as glycidyl acrylate or glycidyl methacrylate in the final stage monomer mixture.

Examples of acrylic core shell polymers are those described in, but not limited to, patents U.S. Pat. Nos. 3,448,173, 3,655,825, and 3,853,968. Examples of suitable acrylic impact modifiers are Kane Ace ECO100 from Kaneka, Durastrength from Arkema, Elvaloy and Elvaloy HP from DuPont, Metablen W from Mitsubishi Chemical, and Paraloid from Dow.

In one class of this embodiment, the impact modifier is an ABS core-shell impact modifier that has a core made out of butadiene-styrene copolymers and shell made out of acrylonitrile-styrene copolymer. Examples of ABS core-shell impact modifiers include Blendex from Galata Chemicals and Elix from Elix Polymers.

In one class of this embodiment, the impact modifier is a silicone-acrylic core-shell impact modifier that has a core made out of silicone-acrylic rubber and shell made out of PMMA copolymer or methyl methacrylate-styrene copolymer.

Examples of silicone-acrylic core-shell impact modifiers include an Metablen S from Mitsubishi Chemical Company.

In embodiments of the invention, the amount of impact modifier in the polymer composition can range from about 1 wt % to about 30 wt %, or from about 1 wt % to about 15 wt %, or from about 5 wt % to about 10 wt %, or from about 10 wt % to about 30 wt %, or from about 15 wt % to about 30 wt %, based on the weight of the polymer composition.

In another aspect, a method of making a polymer composition is provided. The method comprises blending rPET and a copolyester (as described herein); forming a melt processable polymer composition from the blend; melt extruding the melt processable polymer composition to form a thermoplastic article.

In embodiments, a method for providing a transparent injection molded article from a copolyester and rPET blend is provided. In embodiments, the copolyester and rPET blend comprises a copolyester that comprises a diacid component and diol component, wherein the diacid component comprises at least 90 mole % of terephthalic acid (TPA), and the diol component comprises at least 15, or at least 20 mole % of ethylene glycol (EG) residues. In embodiments, the diol component can further comprise up to about 42, or up to about 35, or up to about 30 mole % TMCD or isosorbide residues. In certain embodiments, the diol component can further comprise up to 60 mole % cyclohexanedimethanol (CHDM). In one embodiment, the diol component comprises: 10 to 30 mole %, or 20 to 30 mole % isosorbide residues; 10 to 30 mole %, or 20 to 30 mole % EG residues; and 30 to 60 mole %, or 40 to 60 mole %, or 50 to 60 mole % CHDM.

In embodiments, the copolyester and rPET blend comprises 20 to 60 wt %, or 25 to 60 wt %, or 30 to 60 wt %, or 35 to 60 wt %, or 40 to 60 wt %, or 45 to 60 wt %, or 50 to 60 wt %, or 20 to 50 wt %, or 25 to 50 wt %, or 30 to 50 wt %, or 35 to 50 wt %, or 40 to 50 wt % rPET.

In embodiments, the method for providing a transparent injection molded article from a copolyester and rPET blend, comprises injection molding the blend at a barrel temperature in the range of 280° C. to 320° C., or 285° C. to 315° C., or 290° C. to 315° C., and a mold temperature as low as possible, but where the mold can still be filled. In embodiments the mold temperature is 25° C. or less, or 20° C. or less, or 18° C. or less, or 15° C. or less.

This invention can be further illustrated by the following examples of preferred embodiments thereof, although it will be understood that these examples are included merely for purposes of illustration and are not intended to limit the scope of the invention. Unless otherwise indicated, all weight percentages are based on the total weight of the polymer composition and all molecular weights are weight average molecular weights. Also, all percentages are by weight unless otherwise indicated. Unless indicated otherwise, parts are parts by weight, temperature is in degrees C. or is at room temperature, and pressure is at or near atmospheric.

EXAMPLES

The polymer compositions and the preparation thereof according to the present invention are further illustrated by the following examples.

Unless stated otherwise, the glass transition temperature ($T_g$), melting temperature ($T_m$), heat of crystallization, heat of melting, and percent crystallinity were determined using differential scanning calorimetry (DSC) from the first and second heats of a 20° C./min ramp rate from 0-300° C. utilizing a TA Instruments DSC Q2000 instrument with standard aluminum sample pans containing 3g cut from a molded flexural bar (216×12.7×3.2 mm) according to ASTM D3418-15. Each sample was sealed in an aluminum pan and heated to 300° C. at a rate of 20° C./minute. The sample was then cooled to below its glass transition at a rate of about 20° C./minute to generate an amorphous specimen. The melt temperature, $T_m$, corresponds to the peak of the endotherm observed during the scan.

Unless stated otherwise, inherent viscosity (IV) was determined by measuring at a temperature of 25° C. at 0.5 g/dL concentration in a solvent mixture of symmetric tetrachloroethane and phenol having a weight ratio of symmetric tetrachloroethane to phenol of 2:3 according to ASTM D4603.

The diol and diacid content of the compositions was determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers.

The haze % was measured using a Hunterlab spectrophotometer according to ASTM D1003.

Tensile properties were determined according to ASTM D638.

Flexural properties were determined according to ASTM D790.

Heat deflection temperatures (HDT) at 1.82 and 0.455 MPa were determined according to ASTM D648.

Specific gravities were determined according to ASTM D792.

Notched izod properties were determined according to ASTM D256 with a 10-mil notch using a ⅛-inch thick bar at 23° C.

Unnotched izod properties were determined according to ASTM D4812 using a ⅛-inch thick bar at 23° C.

Plaque clarity was assessed visually and graded as transparent, minimal haze, some haze, heavy haze, or opaque.

The following abbreviations apply throughout the working examples and figures:

| TPA | Terephthalic acid |
| TMCD | 2,2,4,4-tetramethyl-1,3-cyclobutanediol |
| EG | Ethylene Glycol |
| PET | poly(ethylene terephthalate) |
| IV | Inherent viscosity |
| $T_m$ | Melting Point, ° C. |
| $T_g$ | Glass transition temperature, ° C. |
| RT | Room temperature |

Polymer Blends

Polymer blend compositions were prepared as follows:
PET: Pellets of PET 9921 (from Eastman Chemical Company) were obtained.
rPET: Recycled PET flake and pellets (from PolyQuest) were obtained.
Copolyester 1: Pellets of copolyester having diacid residues of 100 mole percent TPA residues, and diol residues of about 23 mole percent TMCD residues and 77 mole percent EG, wherein the copolyester comprises a total of 100 mole percent diacid residues and a total of 100 mole percent diol residues, were prepared. The pellets were prepared in a melt-phase polycondensation process using 0-30 ppm titanium (Ti) catalyst (added in the form of titanium tetraisopropoxide) and 0-94 ppm manganese (Mn) catalyst (added in the form of manganese diacetate), and using 0-80 ppm phosphorous (added in the form of a phosphorous compound, e.g., Merpol A).

Copolyester 2: Pellets of copolyester having diacid residues of 100 mole percent TPA residues, and diol residues of about 35 mole percent TMCD residues and 65 mole percent EG, wherein the copolyester comprises a total of 100 mole percent diacid residues and a total of 100 mole percent diol residues, were prepared. The pellets were prepared in a melt-phase polycondensation process using 0-42 ppm titanium (Ti) catalyst (added in the form of titanium tetraisopropoxide) and 0-94 ppm manganese (Mn) catalyst (added in the form of manganese diacetate), and using 0-150 ppm phosphorous (added in the form of a phosphorous compound, e.g., Merpol A).

The properties of COPOLYESTER 1 and COPOLYESTER 2 are listed below in Table 1.

TABLE 1

Basic Properties of Copolyesters 1 and 2

|  | Copolyester 1 | Copolyester 2 |
| --- | --- | --- |
| Glass Transition Temperature $T_g$, ° C. | 93.0 | 105.0 |
| TMCD mole % | 23 | 35 |
| HDT, ° C. (1.82 MPa) | 70 | 82 |
| Resin IV, dL/g | 0.63 ± 0.1 | 0.59 ± 0.1 |

Example 1: Copolyester 1+(PET or rPET) Blends

Copolyester 1 was blended with PET or rPET in various ratios, as shown in Table 1. The blends were made by melt blending and test articles were molded as described below for each of blends A through F.

TABLE 1

COPOLYESTER 1 and PET blend ratio.

| Blend | Blend Ratio |
| --- | --- |
| A | COPOLYESTER 1 + 10% PET 9921 |
| B | COPOLYESTER 1 + 20% PET 9921 |
| C | COPOLYESTER 1 + 25% PET 9921 |
| D | COPOLYESTER 1 + 25% PolyQuest rPET |
| E | COPOLYESTER 1 + 40% PolyQuest rPET |
| F | COPOLYESTER 1 + 50% PolyQuest rPET |

Blend and Molding Conditions for Blends A-F

A. COPOLYESTER 1 and 10% Eastman PET 9921 were compounded using a 40 mm co-rotating intermeshing twin screw extruder. The COPOLYESTER 1 and PET were fed together. The temperature profile was as follows, zone 1 200° C., zones 3-8 260° C., and the 2 hole die 260° C. The screw speed was 260 RPM with a feed rate of 150 lb/hr. The extruded material was chopped into pellets and then directly molded into Type 1 I tensile dogbone samples from ASTM D638, 216× 12.7×3.2 mm flexural bars, and 10.16×10.16×0.318 cm plaques using a hydraulic Toyo Ti-90G 90 ton injection molding machine with 1.9 oz shot capacity at a 265° C. barrel temperature and 37° C. mold temperature.

B. COPOLYESTER 1 and 20% Eastman PET 9921 were compounded using a 40 mm co-rotating intermeshing twin screw extruder. The COPOLYESTER 1 and PET were fed together. The temperature profile was as follows, zone 1 200° C., zones 3-8 260° C., and the 2 hole die 260° C. The screw speed was 260 RPM with a feed rate of 150 lb/hr. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with a 1.9 oz shot capacity at a 265° C. barrel temperature and 37° C. mold temperature.

C. COPOLYESTER 1 and 25% Eastman PET 9921 were compounded using a 25 mm co-rotating intermeshing twin screw extruder. The COPOLYESTER 1 and PET 9921 were fed at 37.5 lbs. an hour and 12.5 lbs. an hour respectively in two different feeders at the beginning of the extruder. The temperature profile was as follows, zone 2 180° C., zones 3-11 270° C., and the 2 hole die 270° C. The screw speed was 250 RPM with a melt temperature of 266° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with a 1.9 oz shot capacity at a 283° C. barrel temperature and a 38° C. mold temperature.

D. COPOLYESTER 1 and 25% PolyQuest rPET flake were compounded using a 25 mm co-rotating intermeshing twin screw extruder. The COPOLYESTER 1 and rPET were fed at 30 lbs. an hour and 10 lbs. an hour respectively in two different feeders at the beginning of the extruder. The temperature profile was as follows, zones 2 180° C., zones 3-11 265° C., and the 2 hole die 265° C. The melt temperature was 264° C. with a screw speed of 200 RPM. The extruded material was chopped into pellets and then directly molded into Type 1 I tensile dogbone samples from ASTM D638, 216×12.7×3.2 mm flexural bars, and 10.16×10.16×0.318 cm plaques using an electric Toyo Plastar Si-110 110 ton injection molding machine with a 3.4 oz shot size at a 265° C. barrel temperature and a 25-40° C. mold temperature.

E. COPOLYESTER 1 and 40% PolyQuest rPET flake were compounded using a 30 mm co-rotating intermeshing twin screw extruder. The COPOLYESTER 1 and rPET were fed together. The temperature profile was as follows, zone 1 80° C., zone 2 180° C., zones 3-8 275° C., and the 2 hole die 275° C. The screw speed was 305 RPM with a volumetric feed rate of 30%. The extruded material was chopped into pellets and then directly molded into Type 1 I tensile dogbone samples from ASTM D638, 216×12.7×3.2 mm flexural bars, and 10.16×10.16×0.318 cm plaques using an electric Toyo Plastar Si-110 110 ton injection molding machine with a 3.4 oz shot size at 265° C. barrel temperature and a 25-40° C. mold temperature.

F. COPOLYESTER 1 and 50% PolyQuest rPET flake were compounded using a 30 mm co-rotating intermeshing twin screw extruder. The temperature profile was as follows, zone 1 80° C., zone 2 180° C., zones 3-8 275° C., and the 2 hole die 275° C. The screw speed was 305 RPM with a volumetric feed rate of 30%. The extruded material was chopped into pellets and then directly molded into Type 1 I tensile dogbone samples from ASTM D638, 216×12.7×3.2 mm flexural bars, and 10.16×10.16×0.318 cm plaques using an electric Toyo Plastar Si-110 110 ton injection molding machine with a 3.4 oz shot size at 265° C. barrel temperature and a 25-40° C. mold temperature.

Transparency

Plaques made from blends A-F were evaluated for transparency. The results are shown in Table 2.

TABLE 2

Example 1 Transparency Visual Assessment.

| Formulation | Visual Assessment | Processing Conditions |
|---|---|---|
| A | Clear | No special conditions required |
| B | Clear | No special conditions required |
| C | Clear | No special conditions required |
| D | Clear | No special conditions required |
| E | Clear | No special conditions required |
| F | Clear | No special conditions required |

A review of the data from Example 1 shows that Copolyester 1 was miscible with either PET of rPET over the entire loading range and processing conditions. Although not shown, it is believed that Copolyester 1 is fully miscible with PET or rPET at all ratios, i.e., between 0 and 100 wt % PET or rPET.

Example 2: Copolyester 2+ (PET or rPET) Blends

Copolyester 2 was blended with PET or rPET in various ratios, as shown in Table 3. The blends were made by melt blending and test articles were molded as described below for each of blends G through Q.

TABLE 3

COPOLYESTER 2 and PET blends.

| Blend | Blend Ratios |
|---|---|
| G | COPOLYESTER 2 + 10% PET 9921 |
| H | COPOLYESTER 2 + 20% PET 9921 |
| I | COPOLYESTER 2 + 20% PET 9921 |
| J | COPOLYESTER 2 + 25% PET 9921 |
| K | COPOLYESTER 2 + 30% PET 9921 |
| L | COPOLYESTER 2 + 37% PET 9921 |
| M | COPOLYESTER 2 + 40% PET 9921 |
| N | COPOLYESTER 2 + 40% PET 9921 |
| O | COPOLYESTER 2 + 50% PET 9921 |
| P | COPOLYESTER 2 + 53% PET 9921 |
| Q | COPOLYESTER 2 + 25% PolyQuest rPET |

Blend and Molding Conditions for Blends G-Q

G. COPOLYESTER 2 and 10% Eastman PET 9921 were compounded using a 40 mm co-rotating intermeshing twin screw extruder. The COPOLYESTER 2 and PET were fed together. The temperature profile was as follows, zone 1 200° C., zones 2 245° C., zones 3-8 260° C. and the 2 hole die 260° C. The screw speed was 260 RPM with a feed rate of 150 lb/hr. The extruded material was chopped into pellets for use in molding. Transparency studies with COPOLYESTER 2 and PET 9921 were examined with a varying thickness edge gated wedge plaque, 12.7×12.7×0.159-1.27 cm, molded using a Toyo 110 ton injection molding machine with a 3.4 oz shot capacity, molded at temperatures from 265-294° C. Additional Transparency studies were completed with a 10.16×10.16×0.318 cm sprue gated plaque using a Fanuc Roboshot α-s150iA 150 ton injection molding machine with 3.4 oz shot capacity, molded at 1.5 and 6 in/s injection speeds, 271-316° C. melt, and a 15° C. mold.

H. COPOLYESTER 2 and 20% Eastman PET 9921 were compounded using a 40 mm co-rotating intermeshing twin screw extruder. The COPOLYESTER 2 and PET were fed together. The temperature profile was as follows, zone 1 200° C., zones 2 245° C., zones 3-8 260° C. and the 2 hole die 260° C. The screw speed was 260 RPM with a feed rate of 150 lb/hr. The extruded material was chopped into pellets for use in molding. Transparency studies with COPOLYESTER 2 and PET 9921 were examined with a varying thickness edge gated wedge plaque, 12.7×12.7×0.159-1.27 cm, molded using a Toyo 110 ton injection molding machine with a 3.4 oz shot capacity, molded at temperatures from 265-294° C. Additional Transparency studies were completed with a 10.16×10.16×0.318 cm sprue gated plaque using a Fanuc Roboshot α-s150iA 150 ton injection molding machine with 3.4 oz shot capacity, molded at 1.5 and 6 in/s injection speeds, 271-316° C. melt, and a 15° C. mold.

I. COPOLYESTER 2 and 20% Eastman PET 9921 were compounded using a 40 mm co-rotating intermeshing twin screw extruder. The COPOLYESTER 2 and PET were fed together. The temperature profile was as follows, zones 2-6 270° C. and the 2 hole die 270° C. The screw speed was 175 RPM with a feed rate of 150 lb/hr. The extruded material was chopped into pellets and then directly molded into Type 1 I tensile dogbone samples from ASTM D638, 216×12.7×3.2 mm flexural bars, and 10.16×10.16×0.318 cm plaques using a Toyo Plastar TM-150G2 250 ton injection molding machine with a 6.8 oz shot size at a 265° C. barrel temperature and a 26° mold.

J. COPOLYESTER 2 and 25% Eastman PET 9921 were compounded using a 25 mm co-rotating intermeshing twin screw extruder. The COPOLYESTER 2 and PET 9921 were fed at 37.5 lbs. an hour and 12.5 lbs. an hour respectively in two different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature. Transparency studies with COPOLYESTER 2 and PET 9921 were examined with a varying thickness edge gated wedge plaque, 12.7×12.7×0.159-1.27 cm, molded using a Toyo 110 ton injection molding machine with a 3.4 oz shot capacity, molded at temperatures from 265-294° C. Additional Transparency studies were completed with a 10.16×10.16×0.318 cm sprue gated plaque using a Fanuc Roboshot α-s150iA 150 ton injection molding machine with 3.4 oz shot capacity, molded at 1.5 and 6 in/s injection speeds, 265-316° C. melt, and a 15° C. mold.

K. COPOLYESTER 2 and 30% Eastman PET 9921 were compounded using a 30 mm co-rotating intermeshing twin screw extruder. The COPOLYESTER 2 and PET were fed together. The temperature profile was as follows, zone 1 80° C., zone 2 180° C., zone 3-8 265° C., and the 2 hole die 270° C. The screw speed was 317 RPM with a volumetric feed rate of 23%. The extruded material was chopped into pellets for use in molding. Transparency studies with COPOLYESTER 2 and PET 9921 were examined with a varying thickness edge gated wedge plaque, 12.7×12.7×0.159-1.27 cm, molded using a Toyo 110 ton injection molding machine with a 3.4 oz shot capacity, molded at temperatures from 265-294° C. Additional Transparency studies were completed with a 10.16×10.16×0.318 cm sprue gated plaque using a Fanuc Roboshot α-s150iA 150 ton injection molding machine with 3.4 oz shot capacity, molded at 1.5 and 6 in/s injection speeds, 265-316° C. melt, and a 15° C. mold.

L. COPOLYESTER 2 and 37% Eastman PET 9921 were compounded using a 30 mm co-rotating intermeshing twin screw extruder. The COPOLYESTER 2 and PET were fed together. The temperature profile was as follows, zone 1 80° C., zone 2 180° C., zones 3-8 310° C., and the 2 hole die 320° C. The screw speed was 322 RPM with a melt temperature of 322° C. and a volumetric feed rate of 27%. The extruded material was chopped into pellets and then directly molded into Type 1 I tensile dogbone samples from ASTM D638, 216×12.7×3.2 mm flexural bars, and 10.16×10.16×0.318 cm plaques using an electric Toyo Plastar Si-110 110 ton injection molding machine with a 3.4 oz shot size with a barrel temperature of 272° C. and a mold temperature of 27-49° C.

M. COPOLYESTER 2 and 40% Eastman PET 9921 were compounded using a 30 mm co-rotating intermeshing twin screw extruder. The COPOLYESTER 2 and PET were fed together. The temperature profile was as follows, zone 1 80° C., zone 2 180° C., zone 3-8 265° C., and the 2 hole die 270° C. The screw speed was 310 RPM with a volumetric feed rate of 23%. The extruded material was chopped into pellets for use in molding. Transparency studies with COPOLYESTER 2 and PET 9921 were examined with a varying thickness edge gated wedge plaque, 12.7×12.7×0.159-1.27 cm, molded using a Toyo 110 ton injection molding machine with a 3.4 oz shot capacity, molded at temperatures from 265-294° C. Additional Transparency studies were completed with a 10.16×10.16×0.318 cm sprue gated plaque using a Fanuc Roboshot α-s150iA 150 ton injection molding machine with 3.4 oz shot capacity, molded at 1.5 and 6 in/s injection speeds, 265-316° C. melt, and a 15° C. mold.

N. COPOLYESTER 2 and 40% Eastman PET 9921 were compounded using a 40 mm co-rotating intermeshing twin screw extruder. The COPOLYESTER 2 and PET were fed together. The temperature profile was as follows, zones 2-6 270° C. and the 2 hole die 270° C. The screw speed was 175 RPM with a feed rate of 150 lb/hr. The extruded material was chopped into pellets and then directly molded into Type 1 I tensile dogbone samples from ASTM D638, 216×12.7×3.2 mm flexural bars, and 10.16×10.16×0.318 cm plaques using a Toyo Plastar TM-150G2 250 ton injection molding machine with a 6.8 oz shot size at a 265° C. barrel temperature and a 26° C. mold.

O. COPOLYESTER 2 and 50% Eastman PET 9921 were compounded using a 30 mm co-rotating intermeshing twin screw extruder. The COPOLYESTER 2 and PET were fed together. The temperature profile was as follows, zone 1 80° C., zone 2 180° C., zone 3-8 265° C., and the 2 hole die 270° C. The screw speed was 309 RPM with a volumetric feed rate of 23%. The extruded material was chopped into pellets for use in molding. Transparency studies with COPOLYESTER 2 and PET 9921 were examined with a varying thickness edge gated wedge plaque, 12.7×12.7×0.159-1.27 cm, molded using a Toyo 110 ton injection molding machine with a 3.4 oz shot capacity, molded at temperatures from 265-294° C. Additional Transparency studies were completed with a 10.16×10.16×0.318 cm sprue gated plaque using a Fanuc Roboshot α-s150iA 150 ton injection molding machine with 3.4 oz shot capacity, molded at 1.5 in/s injection speeds, 293-316° C. melt, and a 15° C. mold.

P. COPOLYESTER 2 and 53% Eastman PET 9921 were compounded using a 30 mm co-rotating intermeshing twin screw extruder. The COPOLYESTER 2 and PET were fed together. The temperature profile was as follows, zone 1 80° C., zone 2 180° C., zones 3-8 310° C., and the 2 hole die 320° C. The screw speed was 319 RPM with a volumetric feed rate of 27%. The extruded material was chopped into pellets and then directly molded into Type 1 I tensile dogbone samples from ASTM D638, 216×12.7×3.2 mm flexural bars, and 10.16×10.16×0.318 cm plaques using an electric Toyo Plastar Si-110 110 ton injection molding machine with a 3.4 oz shot size at a 272° C. barrel temperature and a 27-49° C. mold temperature.

Q. COPOLYESTER 2 and 25% PolyQuest rPET flake were compounded using a 25 mm co-rotating intermeshing twin screw extruder. The COPOLYESTER 2 and rPET were fed at 25.2 lbs. an hour and 8.8 lbs. an hour respectively in two different feeders at the beginning of the extruder. The temperature profile was as follows, zones 2 180° C., zones 3-9 270° C., zones 10-11 269° and the 2 hole die 270° C. The melt temperature was 278° C. with a screw speed of 350 RPM. The extruded material was chopped into pellets and then directly molded into Type 1 I tensile dogbone samples from ASTM D638, 216×12.7×3.2 mm flexural bars, and 10.16×10.16×0.318 cm plaques using an electric Toyo Plastar Si-110 110 ton injection molding machine with a 3.4 oz shot size at a 272° C. melt temperature and a 25-40° C. mold temperature.

Transparency

Plaques made from blends G-Q were evaluated for transparency. The results are shown in Tables 4- 6.

TABLE 4

Wedge Plaque Transparency Study

| Barrel Temperature (° C.) | Mold Temperature (° C.) | G | H | I | J | K |
|---|---|---|---|---|---|---|
| 265 | 15 | Transparent | Transparent | Transparent | Some Haze | Some Haze |
| 294 | 15 | Transparent | Transparent | Transparent | Transparent | Transparent |

TABLE 5

10.16 × 10.16 × 0.318 cm Plaque Transparency Study (1.5 in/s Injection Speed)

| Barrel Temperature (° C.) | Mold Temperature (° C.) | G | H | I | J | K | O |
|---|---|---|---|---|---|---|---|
| 265 | 15 | Transparent | Transparent | Transparent | Heavy Haze | Heavy Haze | Heavy Haze |
| 282 | 15 | NA | NA | NA | Heavy Haze | Heavy Haze | Heavy Haze |
| 294 | 15 | Transparent | Transparent | Transparent | Heavy Haze | Heavy Haze | Heavy Haze |
| 305 | 15 | NA | NA | NA | Some Haze | Some Haze | Some Haze |
| 316 | 15 | NA | NA | NA | No Haze | Minimal Haze | Minimal Haze |

TABLE 6

10.16 × 10.16 × 0.318 cm Plaque Transparency Study, 6 in/s Injection Speed.

| Barrel Temperature (° C.) | Mold Temperature (° C.) | G | H | I | J | K |
|---|---|---|---|---|---|---|
| 265 | 15 | Transparent | Transparent | Transparent | Heavy Haze | Heavy Haze |
| 294 | 15 | Transparent | Transparent | Transparent | Heavy Haze | Heavy Haze |

A review of the data from Example 2 shows that Copolyester 2 was miscible with either PET of rPET over a range up to 50 wt % PET or rPET, under certain processing conditions. COPOLYESTER 2 blends show transparency up to 25 wt % PET (or rPET) under wide processing conditions and injection molded article shapes. To achieve transparency with loadings greater than 25 wt % PET (or rPET) the barrel temperature of the injection molding machine was increased while the mold temperature was reduced to a minimum temperature while maintaining the ability to fill the mold (Tables 4-6). It was noted that lower barrel temperatures were required to mold transparent thick parts compared to transparent thin parts with PET/rPET loadings greater than 25 wt % (Tables 4 and 5). In addition, injection speed did not appear to have a noticeable effect on the transparency of the molded articles (Tables 5 and 6).

Example 3: Copolyester 2 and rPET Blends Compatibilized with Copolyester 1

Copolyester 2 was blended with rPET and Copolyester 1 in various ratios, as shown in Table 7. The blends were made by melt blending and test articles were molded as described below for each of blends R through W.

TABLE 7

COPOLYESTER 2 and rPET blends compatibilized with COPOLYESTER 1.

| Blend | Blend Ratio |
|---|---|
| R | COPOLYESTER 2 + 1% COPOLYESTER 1 + 25% PolyQuest rPET |
| S | COPOLYESTER 2 + 2.5% COPOLYESTER 1 + 25% PolyQuest rPET |
| T | COPOLYESTER 2 + 5% COPOLYESTER 1 + 25% PolyQuest rPET |
| U | COPOLYESTER 2 + 1% COPOLYESTER 1 + 40% PolyQuest rPET |
| V | COPOLYESTER 2 + 2.5% COPOLYESTER 1 + 40% PolyQuest rPET |
| W | COPOLYESTER 2 + 5% COPOLYESTER 1 + 40% PolyQuest rPET |

Blend and Molding Conditions for Blends R-W

R. COPOLYESTER 2, 1% COPOLYESTER 1, and 25% PolyQuest rPET flake were compounded using a 30 mm co-rotating intermeshing twin screw extruder. The COPOLYESTER 2 and rPET were fed together. The temperature profile was as follows, zone 1 80° C., zone 2 180° C., zones 3-8 275° C., and the 2 hole die 275° C. The screw speed was 310 RPM with a volumetric feed rate of 26%. The extruded material was chopped into pellets and then directly molded into Type 1 I tensile dogbone samples from ASTM D638, 216×12.7× 3.2 mm flexural bars, and 10.16×10.16×0.318 cm plaques using an electric Toyo Plastar Si-110 110 ton injection molding machine with a 3.4 oz shot size at a 299° C. barrel temperature and a 13-18° C. mold temperature.

S. COPOLYESTER 2, 2.5% COPOLYESTER 1, and 25% PolyQuest rPET flake were compounded using a 30 mm co-rotating intermeshing twin screw extruder. The COPOLYESTER 2 and rPET were fed together. The temperature profile was as follows, zone 1 80° C., zone 2 180° C., zones 3-8 275° C., and the 2 hole die 275° C. The screw speed was 310 RPM with a volumetric feed rate of 26%. The extruded material was chopped into pellets and then directly molded into Type 1 I tensile dogbone samples from ASTM D638, 216×12.7× 3.2 mm flexural bars, and 10.16×10.16×0.318 cm plaques using an electric Toyo Plastar Si-110 110 ton injection molding machine with a 3.4 oz shot size a 299° C. barrel temperature and a 13-18° C. mold temperature.

T. COPOLYESTER 2, 5% COPOLYESTER 1, and 25% PolyQuest rPET flake were compounded using a 30 mm co-rotating intermeshing twin screw extruder. The COPOLYESTER 2 and rPET were fed together. The temperature profile was as follows, zone 1 80° C., zone 2 180° C., zones 3-8 275° C., and the 2 hole die 275° C. The screw speed was 310 RPM with a volumetric feed rate of 26%. The extruded material was chopped into pellets and then directly molded into Type 1 I tensile dogbone samples from ASTM D638, 216×12.7× 3.2 mm flexural bars, and 10.16×10.16×0.318 cm plaques using an electric Toyo Plastar Si-110 110 ton injection molding machine with a 3.4 oz shot size a 299° C. barrel temperature and a 13-18° C. mold temperature.

U. COPOLYESTER 2, 1% COPOLYESTER 1, and 40% PolyQuest rPET flake were compounded using a 30 mm co-rotating intermeshing twin screw extruder. The COPOLYESTER 2 and rPET were fed together. The temperature profile was as follows, zone 1 80° C., zone 2 180° C., zones 3-8 275° C., and the 2 hole die 275° C. The screw speed was 310 RPM with a volumetric feed rate of 26%. The extruded material was chopped into pellets and then directly molded into Type 1 I tensile dogbone samples from ASTM D638, 216×12.7× 3.2 mm flexural bars, and 10.16×10.16×0.318 cm plaques using an electric Toyo Plastar Si-110 110 ton injection molding machine with a 3.4 oz shot size a 299° C. barrel temperature and a 13-18° C. mold temperature.

V. COPOLYESTER 2, 2.5% COPOLYESTER 1, and 40% PolyQuest rPET flake were compounded using a 30 mm co-rotating intermeshing twin screw extruder. The COPOLYESTER 2 and rPET were fed together.

The temperature profile was as follows, zone 1 80° C., zone 2 180° C., zones 3-8 275° C., and the 2 hole die 275° C. The screw speed was 310 RPM with a volumetric feed rate of 26%. The extruded material was chopped into pellets and then directly molded into Type 1 I tensile dogbone samples from ASTM D638, 216× 12.7×3.2 mm flexural bars, and 10.16×10.16×0.318 cm plaques using an electric Toyo Plastar Si-110 110 ton injection molding machine with a 3.4 oz shot size a 299° C. barrel temperature and a 13-18° C. mold temperature.

W. COPOLYESTER 2, 5% COPOLYESTER 1, and 40% PolyQuest rPET flake were compounded using 30 mm co-rotating intermeshing twin screw extruder. The COPOLYESTER 2 and rPET were fed together. The temperature profile was as follows, zone 1 80° C., zone 2 180° C., zones 3-8 275° C., and the 2 hole die 275° C. The screw speed was 310 RPM with a volumetric feed rate of 26%. The extruded material was chopped into pellets and then directly molded into Type 1 I tensile dogbone samples from ASTM D638, 216×12.7× 3.2 mm flexural bars, and 10.16×10.16×0.318 cm plaques using an electric Toyo Plastar Si-110 110 ton injection molding machine with a 3.4 oz shot size a 299° C. barrel temperature and a 13-18° C. mold temperature.

Transparency

Plaques made from blends R-W were evaluated for transparency. The results are shown in Table 8.

TABLE 8

10.16 × 10.16 × 0.318 cm Plaque Transparency Study, COPOLYESTER 1 Compatibilized Blends.

| Barrel Temperature (° C.) | Mold Temperature (° C.) | R | S | T | U | V | W |
|---|---|---|---|---|---|---|---|
| 299 | 13-18 | Transparent | Transparent | Transparent | Transparent | Transparent | Transparent |

A review of Table 8 reveals that adding COPOLYESTER 1 to the blend reduced the barrel temperature required to mold transparent articles. It is believed that Copolyester 1 acted as a compatibilizer between COPOLYESTER 2 and the rPET (see Tables 4 and 8).

Example 4: Copolyester 1 Blended with PET and Impact Modifiers

Copolyester 1 was blended with PET and different impact modifiers in various ratios, as shown in Table 8. The blends were made by melt blending and test articles were molded as described below for each of blends X through CC.

TABLE 8

COPOLYESTER 1 blends with PET and impact modifiers.

| Blend | Blend Ratio |
|---|---|
| X | 70% COPOLYESTER 1 + 25% PET + 5% Lotader 8900 |
| Y | 67.5% COPOLYESTER 1 + 25% PET + 7.5% Lotader 8900 |
| Z | 67% COPOLYESTER 1 + 25% PET + 8% ECO100 |
| AA | 63% COPOLYESTER 1 + 25% PET + 12% ECO100 |
| BB | 70% COPOLYESTER 1 + 25% PET + 5% B564 |
| CC | 67.5% COPOLYESTER 1 + 25% PET + 7.5% B564 |

Blend and Molding Conditions for Blends X-CC

X. COPOLYESTER 1+25% PET 9921+5% Lotader 8900 were compounded using a 25 mm co-rotating intermeshing twin screw extruder. The COPOLYESTER 1, 9921, and Lotader 8900 were fed at 35 lbs. an hour, 12.5 lbs. an hour, and 2.5 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

Y. COPOLYESTER 1+25% PET 9921+7.5% Lotader 8900 were compounded using a 25 mm co-rotating intermeshing twin screw extruder. The COPOLYESTER 1, 9921, and Lotader 8900 were fed at 35 lbs. an hour, 12.5 lbs. an hour, and 2.5 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7× 3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

Z. COPOLYESTER 1+25% PET 9921+8% ECO100 were compounded using a 25 mm co-rotating intermeshing twin screw extruder. The COPOLYESTER 1, 9921, and ECO100 were fed at 33.5 lbs. an hour, 12.5 lbs. an hour, and 4 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

AA. COPOLYESTER 1+25% PET 9921+12% ECO100 were compounded using a 25 mm co-rotating intermeshing twin screw extruder. The COPOLYESTER 1, 9921, and ECO100 were fed at 31.5 lbs. an hour, 12.5 lbs. an hour, and 6 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

BB. COPOLYESTER 1+25% PET 9921+5% Kaneka B564 were compounded using a 25 mm co-rotating intermeshing twin screw extruder. The COPOLYESTER 1, 9921, and Kaneka B564 were fed at 35 lbs. an hour, 12.5 lbs. an hour, and 2.5 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

CC. COPOLYESTER 1+25% PET 9921+7.5% Kaneka B564 were compounded using a 25 mm co-rotating intermeshing twin screw extruder. The COPOLYESTER 1, 9921, and Kaneka B564 were fed at 33.75 lbs. an hour, 12.5 lbs. an hour, and 3.75 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

Example 5: Copolyester 2 Blended with PET and Impact Modifiers

Copolyester 2 was blended with PET and different impact modifiers, as shown in Table 9. The blends were made by melt blending and test articles were molded as described below for each of blends DD through FF.

TABLE 9

COPOLYESTER 2 blends with PET and impact modifiers examined.

| | |
|---|---|
| DD | 70% COPOLYESTER 2 + 25% PET + 5% Lotader 8900 |
| EE | 70% COPOLYESTER 2 + 25% PET + 5% ECO100 |
| FF | 70% COPOLYESTER 2 + 25% PET + 5% B564 |

Blend and Molding Conditions for Blends DD-FF

DD. COPOLYESTER 2+25% PET 9921+5% Lotader 8900 were compounded using a 25 mm co-rotating intermeshing twin screw extruder. The COPOLYESTER 2, 9921, and Lotader 8900 were fed at 35 lbs. an hour, 12.5 lbs. an hour, and 2.5 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

EE. COPOLYESTER 2+25% PET 9921+5% ECO100 were compounded using a 25 mm co-rotating intermeshing twin screw extruder. The COPOLYESTER 2, 9921, and ECO100 were fed at 35 lbs. an hour, 12.5 lbs. an hour, and 2.5 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

FF. COPOLYESTER 2+25% PET 9921+5% Kaneka B564 were compounded using a 25 mm co-rotating intermeshing twin screw extruder. The COPOLYESTER 2, 9921, and Kaneka B564 were fed at 35 lbs. an hour, 12.5 lbs. an hour, and 2.5 lbs. an hour respectively in three different feeders at the beginning of the extruder. The temperature profile was as follows, zone 2 180° C., zones 3-11 270° C., and the 2 hole die 270° C. The screw speed was 250 RPM with a melt temperature of 264° C. The extruded material was chopped into pellets and then directly molded into Type 1 I tensile dogbone samples from ASTM D638, 216×12.7×3.2 mm flexural bars, and 10.16×10.16×0.318 cm plaques using a hydraulic Toyo Ti-90G 90 ton injection molding machine with 1.9 oz shot capacity at a 283° C. barrel temperature and a 38° C. mold temperature.

Example 6: Physical Properties of Certain Blends

Samples of blends A, B, C, E, G, H and J from Examples 1 and 2, were tested to determine the blends physical properties. The blend ratios and results of the testing are listed in Tables 10 and 11.

TABLE 10

Physical properties of Blends

| Blends B, C & E Blend J | | | | | |
|---|---|---|---|---|---|
| | COPOLYESTER 1 | 80 | 75 | 60 | |
| | COPOLYESTER 2 | | | | 75 |
| | PET | 20 | 25 | 40 | 25 |
| Flex | Yield Stress | | 84.532 | | 85.955 |
| | Yield Strain | | 4.105 | | 4.774 |
| | Break Stress | 78.57 | 80.512 | 76.16 | 84.974 |
| | Break Strain | | 5.499 | | 5.499 |
| | Modulus | 2403 | 2570.347 | 2420 | 2521.948 |
| HDT | 1.82 MPa | 69.80 | 66.3 | 67.00 | 73.6 |
| | 0.455 MPa | 79.20 | 75.5 | 76.50 | 83.6 |
| Notched Izod | Energy | 45.50 | 45.58 | 47.34 | 49.54 |
| | Mode | C | C | C | C |
| Unnotched Izod | Energy | 2829.50 | 2696.6 | 3020.73 | 2790.01 |
| | Mode | NB | NB | NB | NB |
| Specific Gravity | | | 1.2868 | | 1.264 |
| Tensile | Yield Stress | | 56.5 | | 55.7 |
| | Break Stress | 53.5 | 52.1 | 50.1 | 57.8 |
| | Yield Strain | | 3.9 | | 4.1 |
| | Break Strain | 320.7 | 325.6 | 355 | 272.2 |
| | Modulus | 2179 | 2314 | 2216 | 2293 |
| DSC | Tg | | 87.73 | | 93.53 |
| | Hm (J/g) | | 0.258739 | | 5.73208 |
| | Hcc (J/g) | | 1.112944 | | 2.42421 |
| | % Crystallinity | | −0.60971 | | 2.361078 |

TABLE 11

Physical properties of blends A, B, G and H.

| wt % of Component | | | HDT (° C.) | | DSC |
|---|---|---|---|---|---|
| CO-POLYESTER 1 | CO-POLYESTER 2 | PET 9921 | 0.455 MPa | 1.82 MPa | (° C.) Tg |
| 90 | | 10 | 79.1 | 69.8 | 89.67 |
| 80 | | 20 | 77.4 | 68.9 | 88.17 |
| | 90 | 10 | 86.3 | 75.3 | 99.34 |
| | 80 | 20 | 82.8 | 72.5 | 94.99 |

A review of Tables 10 and 11 reveals that HDT and Tg is reduced as the PET content is increased for both COPOLYESTER 1 and COPOLYESTER 2 blends and with COPOLYESTER 2 blends having higher HDT and Tg values than the COPOLYESTER 1 blends at similar PET ratios. As seen with the DSC data, only a single Tg is measured indicating miscibility in all blends. In addition, the physical properties measured of the blends were within 90% of the physical properties of neat COPOLYESTER 1 or neat COPOLYESTER 2.

Example 7: Comparison of Physical Properties of Blends with PET to Blends with rPET Samples of blends C, D, J and Q from Examples 1 and 2 were tested to determine the blends physical properties. The blend ratios and results of the testing are listed in Table 12.

TABLE 12

Properties measured for samples C, D, J, and Q.

| | | COPOLYESTER 1 + 25% PET: rPET vs. 9921 | | COPOLYESTER 2 + 25% PET: rPET vs. 9921 | |
|---|---|---|---|---|---|
| | LIMS | 840870 | 840879 | 840871 | 840880 |
| Blends C & D | COPOLYESTER 1 | 75 | 75 | | |
| Blends J & Q | COPOLYESTER 2 | | | 75 | 75 |
| | rPET | 25 | | 25 | |
| | 9921 | | 25 | | 25 |
| | B564 | | | | |
| Flex | Yield Stress | 86.646 | 84.532 | | 85.955 |
| | Yield Strain | 5.252 | 4.105 | | 4.774 |
| | Break Stress | 86.648 | 80.512 | 87.676 | 84.974 |
| | Break Strain | 5.5 | 5.499 | 5.499 | 5.499 |
| | Modulus | 2433.049 | 2570.347 | 2370.065 | 2521.948 |
| HDT | 1.82 MPa | 69.8 | 66.3 | 74.7 | 73.6 |
| | 0.455 MPa | 78.3 | 75.5 | 86.2 | 83.6 |
| Instrumented Impact | Energy at Max Load | 37.55 | | 40.02 | |
| | Puncture Energy | 65.33 | | 58.587 | |
| | Total Energy | 67.34 | | 59.26 | |
| | Brittle/Ductile | 100% D | | 1 B, 4 D | |
| Notched Izod | Energy | 51.98 | 45.58 | 54.95 | 49.54 |
| | Mode | 100% C | C | 100% C | C |
| Unnotched Izod | Energy | 2903.11 | 2696.6 | 2960 | 2790.01 |
| | Mode | 100% NB | NB | 100% NB | NB |

TABLE 12-continued

Properties measured for samples C, D, J, and Q.

|  |  | COPOLYESTER 1 + 25% PET: rPET vs. 9921 | | COPOLYESTER 2 + 25% PET: rPET vs. 9921 | |
|---|---|---|---|---|---|
| Specific Gravity |  | 1.2906 | 1.2868 | 1.2672 | 1.264 |
| Tensile | Yield Stress | 56.1 | 56.5 | 55.8 | 55.7 |
|  | Break Stress | 47.5 | 52.1 | 54 | 57.8 |
|  | Yield Strain | 3.9 | 3.9 | 4.1 | 4.1 |
|  | Break Strain | 272.8 | 325.6 | 233.8 | 272.2 |
|  | Modulus | 2393 | 2314 | 2369 | 2293 |
| DSC | Tg* | 87.9 | 87.73 | 93.85 | 93.53 |
|  | Tm | 237.5 | 234.64 | 241.57 | 238.7 |
|  | Tcc | 203.78 | 205.84 | 187.61 | 175.12 |
|  | Hm (cal/g) | 1.449 | 0.06184 | 1.301 | 1.37 |
|  | Hcc (cal/g) | 1.545 | 0.266 | 1.169 | 0.5794 |
|  | Hm (J/g) |  | 0.25873856 |  | 5.73208 |
|  | Hcc (J/g) |  | 1.112944 |  | 2.4242096 |
|  | % Crystallinity** | 0 | 0 | 0.5 | 2.361078087 |
|  |  |  |  | First Heat: | First Heat: |
|  |  |  |  | Tg 1 = 80.37 | First heat is very messy |
|  |  |  |  | Tg 2 = 103.20 | 100.05 |
|  |  |  |  | Single Tg 2nd heat | Single Tg 2nd Heat |

*Tg from second heat
**% Crystallinity from first heat

Table 12 shows a comparison of Copolyester 1 using rPET vs. using PET 9921 and COPOLYESTER 2 using rPET vs. using PET 9921. A review of Table 12 reveals that the flexural modulus was lower with the use of recycled PET while the HDT was higher. The cold crystallization temperature with rPET was also higher than that of PET 9921 in COPOLYESTER 2.

Example 8: Comparison of Copolyester 1 and 2 Blends with Equal Net TMCD Content Samples of blend L and Neat Copolyester 1 were tested to determine the physical properties of each. The blend ratios and results of the testing are listed in Table 13.

TABLE 13

Properties measured for sample L and neat COPOLYESTER 1.

|  |  | Blend L | Neat CO-POLYESTER 1 |
|---|---|---|---|
|  | LIMS | 840873 |  |
|  | COPOLYESTER 1 |  | 100 |
|  | COPOLYESTER 2 | 63 |  |
|  | rPET |  |  |
|  | 9921 | 37 |  |
|  | B564 |  |  |
| Flex | Yield Stress | 86.818 | 85 |
|  | Yield Strain | 5.414 |  |
|  | Break Stress | 86.787 |  |
|  | Break Strain | 5.499 |  |
|  | Modulus | 2369.611 | 2360 |
| HDT | 1.82 MPa | 71.9 | 70 |
|  | 0.455 MPa | 81.7 | 80 |
| Instrumented Impact | Energy at Max Load | 40.49 | 38 |
|  | Puncture Energy | 69.067 |  |
|  | Total Energy | 70.48 | 68 |
|  | Brittle/Ductile | 100% D | 100% D |
| Notched Izod | Energy | 54.38 | 55 |
|  | Mode | 100% C | 100% C |
| Unnotched Izod | Energy | 2933.37 |  |
|  | Mode | 100% NB | 100% NB |
| Specific Gravity |  | 1.2744 | 1.28 |
| Tensile | Yield Stress | 55.9 | 55 |
|  | Break Stress | 59.5 | 52 |

TABLE 13-continued

Properties measured for sample L and neat COPOLYESTER 1.

|  |  | Blend L | Neat CO-POLYESTER 1 |
|---|---|---|---|
|  | Yield Strain | 4 | 4.1 |
|  | Break Strain | 325.9 | 333 |
|  | Modulus | 2392 | 2360 |
| DSC | Tg* | 91.31 | 93 |
|  | Tm | 237.35 | — |
|  | Tcc | 177.91 |  |
|  | Hm (cal/g) | 0.9773 | — |
|  | Hcc (cal/g) | 1.836 | — |
|  | Hm (J/g) |  |  |
|  | Hcc (J/g) |  |  |
|  | % Crystallinity** | 0 |  |
|  |  | First Heat: |  |
|  |  | Tg 1 = 80.15 |  |
|  |  | Tg 2 = 100.70 |  |
|  |  | Single Tg 2nd heat |  |

*Tg from second heat
**% Crystallinity from first heat

Table 13 shows a comparison of COPOLYESTER 2 blended with PET 9921 that had an equivalent net wt % of TMCD (Blend L) as that of neat COPOLYESTER 1. A review of Table 13 reveals that Blend L had a higher HDT than neat COPOLYESTER 1. In addition, Blend L had two Tgs, a cold crystallization temperature, and a melting temperature on the first heat of a DSC scan indicating there is some immiscibility in Blend L. As COPOLYESTER 1 is a neat product and the crystallization half time is very large, no evidence of crystallinity (cold crystallization temperature, melt temperature) was seen in the neat COPOLYESTER 1.

Example 9: Copolyester 1 and Copolyester 2 Blends with Equivalent TMCD Content Samples of blends P, C and D from Examples 1 and 2, were tested to determine the blends physical properties. The blend ratios and results of the testing are listed in Table 14.

TABLE 14

Properties measured for samples P, C, and D.

|  |  | COPOLYESTER 2 Equivalent to 75/25 COPOLYESTER 1/PET | COPOLYESTER 1 + 25% 9921 | COPOLYESTER 1 + 25% rPET |
|---|---|---|---|---|
|  | LIMS | 840872 | 840879 | 840870 |
|  | COPOLYESTER 1 |  | 75 | 75 |
|  | COPOLYESTER 2 | 47 |  |  |
|  | Rpet |  |  | 25 |
|  | 9921 | 53 | 25 |  |
|  | B564 |  |  |  |
| Flex | Yield Stress | 86.093 | 84.532 | 86.646 |
|  | Yield Strain | 5.254 | 4.105 | 5.252 |
|  | Break Stress | 85.879 | 80.512 | 86.648 |
|  | Break Strain | 5.499 | 5.499 | 5.5 |
|  | Modulus | 2389.566 | 2570.347 | 2433.049 |
| HDT | 1.82 MPa | 68.1 | 66.3 | 69.8 |
|  | 0.455 MPa | 77.4 | 75.5 | 78.3 |
| Instrumented Impact | Energy at Max Load | 41.48 |  | 37.55 |
|  | Puncture Energy | 65.783 |  | 65.33 |
|  | Total Energy | 66.51 |  | 67.34 |
|  | Brittle/Ductile | 100% D |  | 100% D |
| Notched Izod | Energy | 54.77 | 45.58 | 51.98 |
|  | Mode | 100% C | 100% C | 100% C |
| Unnotched Izod | Energy | 2933.64 | 2696.6 | 2903.11 |
|  | Mode | 100% NB | 100% NB | 100% NB |
| Specific Gravity |  | 1.2887 | 1.2868 | 1.2906 |
| Tensile | Yield Stress | 56.2 | 56.5 | 56.1 |
|  | Break Stress | 52.9 | 52.1 | 47.5 |
|  | Yield Strain | 3.9 | 3.9 | 3.9 |
|  | Break Strain | 333.9 | 325.6 | 272.8 |
|  | Modulus | 2391 | 2314 | 2393 |
| DSC | Tg* | 86.47 | 87.73 | 87.9 |
|  | Tm | 237.93 | 234.64 | 237.5 |
|  | Tcc | 176.21 | 205.84 | 203.78 |
|  | Hm (cal/g) | 1.993 | 0.06184 | 1.449 |
|  | Hcc (cal/g) | 2.802 | 0.266 | 1.545 |
|  | Hm (J/g) |  | 0.25873856 |  |
|  | Hcc (J/g) |  | 1.112944 |  |
|  | % Crystallinity** | 0 | 0 | 0 |
|  |  | First Heat: Tg1: 80.16C Tg2: 99.13C Single Tg second heat |  |  |

*Tg from second heat
**% Crystallinity from first heat

Table 14 shows a comparison of Blends P, C and D, with equivalent wt % of TMCD in each blend. A review of Table 14 reveals that the flexural modulus was lower and the HDT was higher for Blend P compared to either of Blends C or D. Also, Blend P had two Tgs on the first heat indicating some immiscibility in the as-molded blend. A single Tg was seen on a second heat consistent with Blends C and D. The cold crystallization temperature on the first heat of Blend P was lower than that of Blends C and D. This would also indicate some immiscibility in the as-molded Blend P.

Example 10: Copolyester 1 Blends with Impact Modifier

Samples of blends X, Y, Z, AA, BB and CC from Example 4 were tested to determine the blends physical properties. The blend ratios and results of the testing are listed in Table 15 and additional test results after aging are listed in Table 16.

TABLE 15

Properties measured of samples X, Y, Z, AA, BB, and CC.

|  | Blend | X | Y | Z | AA | BB | CC |
|---|---|---|---|---|---|---|---|
|  | COPOLYESTER 1 | 70 | 67.5 | 67 | 63 | 72.5 | 70 |
|  | PET | 25 | 25 | 25 | 25 | 25 | 25 |
|  | Lotader 8900 | 5 | 7.5 |  |  |  |  |
|  | Eco100 |  |  | 8 | 12 |  |  |
|  | B564 |  |  |  |  | 5 | 7.5 |
| Flex | Yield Stress | 71.061 | 66.34 | 70.555 | 64.391 | 73.212 | 69.237 |
|  | Yield Strain | 4.271 | 4.261 | 3.942 | 3.903 | 4.232 | 4.165 |

TABLE 15-continued

Properties measured of samples X, Y, Z, AA, BB, and CC.

|  | Blend | X | Y | Z | AA | BB | CC |
|---|---|---|---|---|---|---|---|
|  | Break Stress | 69.476 | 65.098 | 68.183 | 62.468 | 71.39 | 67.737 |
|  | Break Strain | 5.499 | 5.499 | 5.499 | 5.499 | 5.499 | 5.499 |
|  | Modulus | 2218.179 | 2099.89 | 2231.638 | 2081.877 | 2269.752 | 2181.022 |
| HDT | 1.82 MPa | 66.5 | 65.5 | 65.4 | 63.8 | 66.8 | 66.1 |
|  | 0.455 MPa | 75.6 | 74.5 | 73 | 70.3 | 73.4 | 72.7 |
| Notched Izod | Energy | 87.88 | 1199.9 | 1110.9 | 1126.52 | 99.05 | 1329.1 |
|  | Mode | C | NB | NB | NB | C | NB |
| Unnotched Izod | Energy | 2337.6 | 2350.6 | 2434.46 | 2349.6 | 2507.04 | 2435.24 |
|  | Mode | NB | NB | NB | NB | NB | NB |
| Specific Gravity |  | 1.2691 | 1.2591 | 1.2687 | 1.2565 | 1.2678 | 1.2587 |
| Tensile | Yield Stress | 48.6 | 45.2 | 46.9 | 43.6 | 50.2 | 47.1 |
|  | Break Stress | 52.5 | 51.2 | 45.4 | 48.4 | 50.2 | 53.4 |
|  | Yield Strain | 3.9 | 3.7 | 3.6 | 3.6 | 3 | 3.6 |
|  | Break Strain | 310.2 | 287.3 | 341.7 | 363.4 | 315 | 355 |
|  | Modulus | 1997 | 1905 | 2000 | 1843 | 2106 | 2015 |
| DSC | Tg | 87.42 | 87.08 | 86.26 | 85.96 | 87.23 | 86.49 |
|  | Hm (J/g) | 1.352687 | 4.76976 | 7.288528 | 10.434896 | 2.0204536 | 4.1283528 |
|  | Hcc (J/g) | 2.148066 | 5.242552 | 8.188088 | 9.384712 | 2.8279656 | 4.485248 |
|  | % Crystallinity** | 0 | 0 | 0 | 0 | 0 | 0 |

TABLE 16

Effect of aging on blends of Table 15.

| COPOLYESTER 1 | 75 | 70 | 67.5 | 67 | 63 | 72.5 | 70 |
|---|---|---|---|---|---|---|---|
| PET | 25 | 25 | 25 | 25 | 25 | 25 | 25 |
| Lotader 8900 |  | 5 | 7.5 |  |  |  |  |
| Eco100 |  |  |  | 8 | 12 |  |  |
| B564 |  |  |  |  |  | 5 | 7.5 |

Before Aging

|  |  |  |  |  |  |  |  |  |
|---|---|---|---|---|---|---|---|---|
| Notched Izod | Energy | 45.58 | 87.88 | 1199.9 | 1110.9 | 1126.52 | 99.05 | 1329.1 |
|  | Mode | C | C | NB | NB | NB | C | NB |
| Tensile | Yield Stress | 56.5 | 48.6 | 45.2 | 46.9 | 43.6 | 50.2 | 47.1 |

After Aging for 66 hr at 60° C.

|  |  |  |  |  |  |  |  |  |
|---|---|---|---|---|---|---|---|---|
| Notched Izod | Energy | 28.4 | 53.5 | 225.6 | 57.8 | 139 | 49.9 | 104.9 |
|  | Mode | C | C | C (80%) | C | C | C | C |
| Tensile | Yield Stress | 70.2 | 56 | 52.6 | 55.7 | 50.3 | 57.8 | 53.4 |

A review of Tables 15 and 16 reveals that the addition of the impact modifiers resulted in a small decrease in HDT and Tg, but significant increases in izod impact strength, compared to similar blends in Tables 10-13 (without impact modifiers). Adding impact modifier to polymers typically noticeably reduces the modulus of a polymer while improving the impact performance. However, when adding impact modifier to the COPOLYESTER 1 and PET blends the modulus decreased less than 10%. Therefore, the data shows that impact performance of these blends can be improved while maintaining the stiffness of the material.

The addition of impact modifiers also decreased the rate of physical aging of the blend as compared with a non-modified blend as evidenced by the notched izod energy and tensile yield stress. A higher notched izod energy indicates better impact performance, while a lower tensile yield stress indicates less physical aging.

Example 11: Copolyester 2 Blends with Impact Modifier

Samples of blends DD, EE and FF from Example 5 were tested to determine the blends physical properties. The blend ratios and results of the testing are listed in Table 17 and additional test results after aging are listed in Table 18.

TABLE 17

Properties measured for samples DD, EE, and FF.

|  | Blend | DD | EE | FF |
|---|---|---|---|---|
|  | CO-POLYESTER 2 | 70 | 70 | 70 |
|  | PET | 25 | 25 | 25 |
|  | Lotader 8900 | 5 |  |  |
|  | Eco100 |  | 5 |  |
|  | B564 |  |  | 5 |
| Flex | Yield Stress | 72.91 | 77.614 | 74.272 |
|  | Yield Strain | 4.659 | 4.95 | 5.014 |
|  | Break Stress | 72.236 | 77.16 | 73.973 |
|  | Break Strain | 5.5 | 5.499 | 5.499 |
|  | Modulus | 2197.171 | 2287.743 | 2191.549 |
| HDT | 1.82 MPa | 70.1 | 69.8 | 69.7 |
|  | 0.455 MPa | 80.8 | 81.6 | 82.9 |
| Notched Izod | Energy | 1222.25 | 97.5 | 1138.9 |
|  | Mode | NB | C | NB |
| Unnotched Izod | Energy | 2524.03 | 2719.15 | 2639.73 |
|  | Mode | NB | NB | NB |
| Specific Gravity |  | 1.2464 | 1.2529 | 1.2487 |
| Tensile | Yield Stress | 47.3 | 50.9 | 50.1 |
|  | Break Stress | 51.2 | 51.2 | 52.5 |
|  | Yield Strain | 3.9 | 4 | 3.9 |

TABLE 17-continued

Properties measured for samples DD, EE, and FF.

| | Blend | DD | EE | FF |
|---|---|---|---|---|
| | Break Strain | 223 | 240.9 | 241.4 |
| | Modulus | 1982 | 2114 | 2092 |
| DSC | Tg | 91.73 | 92.37 | 91.92 |
| | Hm (J/g) | 0.943074 | 5.35552 | 4.95804 |
| | Hcc (J/g) | 1.825479 | 6.196504 | 7.146272 |
| | % Crystallinity** | 0 | 0 | 0 |

TABLE 18

Effect of aging on blends of Table 17.

| | | | | | |
|---|---|---|---|---|---|
| COPOLYESTER 2 | | 75 | 70 | 70 | 70 |
| PET | | 25 | 25 | 25 | 25 |
| Lotader 8900 | | | 5 | | |
| Eco100 | | | | 5 | |
| B564 | | | | | 5 |

Before Aging

| | | | | | |
|---|---|---|---|---|---|
| Notched Izod | Energy | 49.54 | 1222.25 | 97.5 | 1138.9 |
| | Mode | C | NB | C | NB |
| Tensile | Yield Stress | 55.7 | 47.3 | 50.9 | 50.1 |

After Aging for 66 hr at 60° C.

| | | | | | |
|---|---|---|---|---|---|
| Notched Izod | Energy | 34.7 | 107.2 | 52.5 | 71.3 |
| | Mode | C | C | C | C |
| Tensile | Yield Stress | 66.7 | 55 | 59.4 | 57.3 |

A review of Tables 17 and 18 reveals that the addition of the impact modifiers resulted in a decrease in HDT and Tg, and significant increases in izod impact strength, compared to similar blends in Tables 10-13 (without impact modifiers). Adding impact modifier to polymers typically noticeably reduces the modulus of a polymer while improving the impact performance. However, when adding impact modifier to the COPOLYESTER 2 and PET blends, the modulus decreased less than 10%. Therefore, the impact performance of these blends can be improved while maintaining the stiffness of the material.

The addition of impact modifiers also decreased the rate of physical aging of the blend as compared with a non-modified blend as evidenced by the notched izod energy and tensile yield stress. A higher notched izod energy indicates better impact performance, while a lower tensile yield stress indicates less physical aging.

Example 12: Comparison of Copolyester 1 and 2 Blends with Equivalent TMCD Content and Impact Modifier Samples of blends BB and FF from Examples 4 and 5 were tested to determine the blends physical properties. The blend ratios and results of the testing are listed in Table 19.

TABLE 19

Properties measured for samples BB and FF.

| | | COPOLYESTER 2 Equivalent to 5% IM COPOLYESTER 1/PET 70/25 | COPOLYESTER 1 + 25% 9921 + 5% B564 |
|---|---|---|---|
| LIMS | | 840874 | 840874 |
| COPOLYESTER 1 | | | 70 |
| COPOLYESTER 2 | | 44 | |
| rPET | | | 25 |
| 9921 | | 51 | |
| B564 | | 5 | 5 |
| Flex | Yield Stress | 74.983 | 73.212 |
| | Yield Strain | 4.439 | 4.232 |
| | Break Stress | 74.206 | 71.39 |
| | Break Strain | 5.499 | 5.499 |
| | Modulus | 2187.036 | 2269.752 |
| HDT | 1.82 MPa | 66.6 | 66.8 |
| | 0.455 MPa | 76.5 | 73.4 |
| Instrumented Impact | Energy at Max Load | 36.39 | |
| | Puncture Energy | 63.802 | |
| | Total Energy | 65.8 | |
| | Brittle/Ductile | 100% D | |
| Notched Izod | Energy | 123.85 | 99.05 |
| | Mode | 100% C | C |
| Un-notched Izod | Energy | 2675.86 | 2507.04 |
| | Mode | 100% NB | NB |
| Specific Gravity | | 1.2702 | 1.2678 |
| Tensile | Yield Stress | 50.2 | 50.2 |
| | Break Stress | 54.7 | 50.2 |
| | Yield Strain | 3.7 | 3 |
| | Break Strain | 375.7 | 315 |
| | Modulus | 2200 | 2106 |
| DSC | Tg* | 85.62 | 87.23 |
| | Tm | 238.18 | 231.48 |
| | Tcc | 171.72 | 199.9 |
| | Hm (cal/g) | 4.349 | 0.4829 |
| | Hcc (cal/g) | 5.434 | 0.6759 |
| | Hm (J/g) | | 2.0204536 |
| | Hcc (J/g) | | 2.8279656 |
| | % Crystallinity** | 0 | 0 |
| | | First Heat: Tg 1 = 79.47 Tg 2 = 97.35 Single Tg 2nd heat | |

*Tg from second heat
**% Crystallinity from first heat

Table 19 compares Blends BB and FF, where each blend had equivalent net wt % of TMCD and 5 wt % B564 Impact Modifier. A review of Table 19 reveals that the flexural modulus was lower for Blend FF. The low pressure HDT of Blend FF was higher than that of Blend BB. However, Blends BB and FF had about the same high pressure HDT. Blend FF also had a higher tensile modulus, lower Tg and lower cold crystallization temperature.

Example 13: Ecozen Polymer and rPET Blends

Ecozen T110 or T90 polyester was blended with rPET in different ratios, as shown in Table 20. The blends were made by melt blending and test articles were molded as described below for each of blends GG through JJ.

TABLE 20

Ecozen and PET blends.

| Blend | Blend Ratio |
|---|---|
| GG | Ecozen T110 + 25% PolyQuest rPET pellets |
| HH | Ecozen T110 + 40% PolyQuest rPET pellets |
| II | Ecozen T90 + 25% PolyQuest rPET pellets |
| JJ | Ecozen T90 + 40% PolyQuest rPET pellets |

GG. Ecozen T110 and 25% PolyQuest rPET pellets were compounded using a 25 mm co-rotating intermeshing twin screw extruder. The Ecozen T110 and rPET were fed at 48.8 lbs. an hour and 16.3 lbs. an hour respectively in two different feeders at the beginning of the extruder. The temperature profile was as follows, zone 2 200° C., zones 3-11 280° C., and the 2 hole die with a 50 mesh screen pack 280° C. The melt temperature was 269° C. with a screw speed of 250 RPM. The extruded material was chopped into pellets for use in molding. Transparency studies were completed with a 10.16×10.16×0.318 cm sprue gated plaque using a Fanuc Roboshot α-s150iA 150 ton injection molding machine with 3.4 oz shot capacity, molded at 1.5 in/s injection speeds, 282-305° C. melt, and a 15° C. mold.

HH. Ecozen T110 and 40% PolyQuest rPET pellets were compounded using a 25 mm co-rotating intermeshing twin screw extruder. The Ecozen T110 and rPET were fed at 39 lbs. an hour and 26 lbs. an hour respectively in two different feeders at the beginning of the extruder. The temperature profile was as follows, zone 2 200° C., zones 3-11 280° C. and the 2 hole die with a 50 mesh screen pack 280° C. The melt temperature was 269° C. with a screw speed of 250 RPM. The extruded material was chopped into pellets for use in molding. Transparency studies were completed with a 10.16×10.16×0.318 cm sprue gated plaque using a Fanuc Roboshot α-s150iA 150 ton injection molding machine with 3.4 oz shot capacity, molded at 1.5 in/s injection speeds, 282-305° C. melt, and a 15° C. mold.

II. Ecozen T90 and 25% PolyQuest rPET pellets were compounded using a 25 mm co-rotating intermeshing twin screw extruder. The Ecozen T90 and rPET were fed at 48.8 lbs. an hour and 16.3 lbs. an hour respectively in two different feeders at the beginning of the extruder. The temperature profile was as follows, zone 2 200° C., zones 3-11 280° C., and the 2 hole die with a 50 mesh screen pack 280° C. The melt temperature was 266° C. with a screw speed of 250 RPM. The extruded material was chopped into pellets for use in molding. Transparency studies were completed with a 10.16×10.16×0.318 cm sprue gated plaque using a Fanuc Roboshot α-s150iA 150 ton injection molding machine with 3.4 oz shot capacity, molded at 1.5 in/s injection speeds, 282-305° C. melt, and a 15° C. mold.

JJ. Ecozen T90 and 40% PolyQuest rPET pellets were compounded using a 2557 mm co-rotating intermeshing twin screw extruder. The Ecozen T90 and rPET were fed at 39 lbs. an hour and 26 lbs. an hour respectively in two different feeders at the beginning of the extruder. The temperature profile was as follows, zone 2 200° C., zones 3-11 280° C., and the 2 hole die with a 50 mesh screen pack 280° C. The melt temperature was 266° C. with a screw speed of 250 RPM. The extruded material was chopped into pellets for use in molding. Transparency studies were completed with a 10.16×10.16×0.318 cm sprue gated plaque using a Fanuc Roboshot α-s150iA 150 ton injection molding machine with 3.4 oz shot capacity, molded at 1.5 in/s injection speeds, 282-305° C. melt, and a 15° C. mold.

Transparency

Plaques made from blends GG-JJ were evaluated for transparency. The results are shown in Table 21.

TABLE 21

10.16 × 10.16 × 0.318 cm Plaque Transparency Study, 1.5 in/s Injection Speed.

| Barrel Temperature (° C.) | Mold Temperature (° C.) | GG | HH | II | JJ |
|---|---|---|---|---|---|
| 282 | 15 | Some Haze | Heavy Haze | Some Haze | Heavy Haze |
| 294 | 15 | Minimal Haze | Some Haze | Minimal Haze | Some Haze |
| 305 | 15 | Transparent | Minimal Haze | Transparent | Minimal Haze |

Transparency was achievable for the blends with specific processing conditions. To achieve transparency for Blends GG-JJ, the barrel temperature of the injection molding machine had to be increased while the mold temperature was reduced to a minimum temperature possible while still maintaining the ability to fill the mold (see Table 21).

The invention has been described in detail with particular reference to preferred embodiments thereof, but it will be understood that variations and modifications can be affected within the spirit and scope of the invention.

We claim:

1. A polymer composition comprising a blend of recycled poly(ethylene terephthalate) (rPET) and at least one copolyester,
   said copolyester comprising:
   (a) diacid residues comprising from 90 to 100 mole percent of terephthalic acid (TPA) residues; and
   (b) diol residues comprising 73 to 85 mole percent of ethylene glycol (EG) residues and 15 to 27 mole percent of 2,2,4,4-tetramethyl-1,3-cyclobutanediol (TMCD) residues, wherein the copolyester comprises a total of 100 mole percent diacid residues and a total of 100 mole percent diol residues, wherein the blend comprises 10 to 40 weight percent rPET and has a haze of less than 4% measured on a 10.16×10.16×0.318 cm injection molded plaque using a using a spectrophotometer according to ASTM D1003.

2. The polymer composition according to claim 1, wherein the blend is miscible and is visually clear.

3. The polymer composition according to claim 1, wherein the copolyester comprises diol residues comprising from 15 to 25 mole percent TMCD residues and from 75 to 85 mole percent EG residues.

4. The polymer composition according to claim 1, wherein the blend comprises 15 to 25 weight percent rPET.

5. The polymer composition according to claim 1, wherein the blend comprises diol residues comprising from 10 to 20 net mole percent of TMCD residues, wherein the blend comprises a total of 100 mole percent diacid residues and a total of 100 mole percent diol residues.

6. The polymer composition according to claim 1, wherein the blend has a $T_g$ of at least 78° C., and a $T_m$ of at least 255° C.

7. The polymer composition according to claim 1, wherein the blend has an HDT of at least 63° C. at 1.82 MPa loading.

8. The polymer composition according to claim 1, wherein the blend has an HDT of at least 70° C. at 1.82 MPa loading.

9. A polymer composition comprising a blend of recycled poly(ethylene terephthalate) (rPET) and at least one copolyester, said copolyester comprising:
(a) diacid residues comprising from 90 to 100 mole percent of terephthalic acid (TPA) residues; and
(b) diol residues comprising 73 to 85 mole percent of ethylene glycol (EG) residues and 15 to 27 mole percent of 2,2,4,4-tetramethyl-1,3-cyclobutanediol (TMCD) residues, wherein the copolyester comprises a total of 100 mole percent diacid residues and a total of 100 mole percent diol residues;

said polymer composition further comprising at least one impact modifier;

wherein the polymer blend has a haze of less than 4% measured on a 10.16×10.16×0.318 cm injection molded plaque using a using a spectrophotometer according to ASTM D1003.

10. The polymer composition according to claim 9, wherein the polymer composition comprises 10 to 40 weight percent rPET, 45 to 89 weight percent copolyester, and 1 to 15 weight percent impact modifier.

11. The polymer composition according to claim 10, wherein the impact modifier is a core shell impact modifier.

* * * * *